United States Patent
Lin et al.

(10) Patent No.: US 11,959,814 B2
(45) Date of Patent: Apr. 16, 2024

(54) HIGH-TEMPERATURE DRY BLOCK TEMPERATURE CALIBRATOR

(71) Applicant: BEIJING CONST INSTRUMENTS TECHNOLOGY INC., Beijing (CN)

(72) Inventors: Jianjun Lin, Beijing (CN); Xuecan Li, Beijing (CN); Chengjiang Wu, Beijing (CN)

(73) Assignee: BEIJING CONST INSTRUMENTS TECHNOLOGY INC., Beijing (CN)

( * ) Notice: Subject to any disclaimer, the term of this patent is extended or adjusted under 35 U.S.C. 154(b) by 951 days.

(21) Appl. No.: 16/960,990

(22) PCT Filed: Jan. 7, 2019

(86) PCT No.: PCT/CN2019/070623
§ 371 (c)(1),
(2) Date: Jul. 9, 2020

(87) PCT Pub. No.: WO2019/137331
PCT Pub. Date: Jul. 18, 2019

(65) Prior Publication Data
US 2020/0370971 A1    Nov. 26, 2020

(30) Foreign Application Priority Data

Jan. 9, 2018 (CN) .......... 201810018505.9
Jan. 9, 2018 (CN) .......... 201810019048.5
(Continued)

(51) Int. Cl.
*G01K 15/00* (2006.01)
*F27D 1/12* (2006.01)
(Continued)

(52) U.S. Cl.
CPC ............ *G01K 15/005* (2013.01); *F27D 1/12* (2013.01); *F27D 9/00* (2013.01); *F27D 19/00* (2013.01);
(Continued)

(58) Field of Classification Search
CPC .................. G01K 15/005; F27D 1/12
See application file for complete search history.

(56) References Cited

U.S. PATENT DOCUMENTS 3,738,174 A * 6/1973 Waldron ............... G05D 23/24
                                                374/173
4,075,882 A * 2/1978 Waldron ............... G01K 7/20
                                                374/1
(Continued)

FOREIGN PATENT DOCUMENTS

CN    204188309 U    3/2015
CN    105651421 A    6/2016
(Continued)

OTHER PUBLICATIONS

Oct. 8, 2021 Partial Supplementary Search Report issued in European Patent Application No. 19737990.2.
(Continued)

*Primary Examiner* — John J Norton
(74) *Attorney, Agent, or Firm* — Oliff PLC

(57) ABSTRACT

A high temperature dry block temperature calibrator relates to the technical field of temperature calibration. The high temperature dry block temperature calibrator includes a high temperature furnace, a control board module, a system board module, a measuring board module, a lower support, and a housing. The high temperature furnace and the control board module are mounted on the lower support. The system board module and the measuring board module are mounted on the front side surface of the housing. The housing is clipped to
(Continued)

the periphery of the lower support and the high temperature furnace and the control board module are accommodated in the housing. The modules are independent of each other and can be removed separately, thereby facilitating maintenance and replacement. The high temperature dry block temperature calibrator can be used for calibrating the temperature of a high temperature element to be measured.

17 Claims, 17 Drawing Sheets

(30) Foreign Application Priority Data

| Jan. 9, 2018 | (CN) | 201810019512.0 |
|---|---|---|
| Jan. 9, 2018 | (CN) | 201810019765.8 |
| Jan. 9, 2018 | (CN) | 201820031598.4 |
| Jan. 9, 2018 | (CN) | 201820032017.9 |
| Jan. 9, 2018 | (CN) | 201820032127.5 |
| Jan. 9, 2018 | (CN) | 201820032809.6 |
| Jan. 9, 2018 | (CN) | 201820033216.1 |

(51) Int. Cl.
*F27D 9/00* (2006.01)
*F27D 19/00* (2006.01)
*F27D 21/00* (2006.01)
*G01K 7/12* (2006.01)

(52) U.S. Cl.
CPC .......... *F27D 21/0014* (2013.01); *G01K 7/12* (2013.01); *F27D 2009/0005* (2013.01); *F27D 2019/0003* (2013.01)

(56) References Cited

U.S. PATENT DOCUMENTS

| 4,901,257 | A | * | 2/1990 | Chang | G05D 23/1919 |
|---|---|---|---|---|---|
| | | | | | 324/714 |
| 2007/0291814 | A1 | | 12/2007 | Hirst | |
| 2009/0064603 | A1 | | 3/2009 | James et al. | |
| 2013/0148687 | A1 | | 6/2013 | Sjogren et al. | |

FOREIGN PATENT DOCUMENTS

| CN | 207675335 U | 7/2018 |
|---|---|---|
| CN | 207675336 U | 7/2018 |
| CN | 207865982 U | 9/2018 |
| CN | 207866391 U | 9/2018 |
| EP | 0 686 835 A1 | 12/1995 |

OTHER PUBLICATIONS

Mar. 28, 2019 Written Opinion issued in International Patent Application No. PCT/CN2019/070623.

Mar. 27, 2019 International Search Report issued in International Patent Application No. PCT/CN2019/070623.

Jul. 14, 2020 International Preliminary Report on Patentability issued in International Patent Application No. PCT/CN2019/070623.

Mar. 16, 2022 Extended Search Report issued in European Patent Application No. 19737990.2.

* cited by examiner

HIGH-TEMPERATURE DRY BLOCK TEMPERATURE CALIBRATOR

TECHNICAL FIELD

The present disclosure belongs to the technical field of temperature calibration, relates to a temperature calibrator, and particularly relates to a high-temperature dry block temperature calibrator.

BACKGROUND ART

Temperature calibrators are used to calibrate temperature measurement apparatuses such as thermometers or thermal switches and the like, which are widely applied in industrial sites, measurement places and laboratories in all walks of life and have broad market aspects.

High-temperature dry block temperature calibrators are used to calibrate temperature measurement apparatuses, and require a high-temperature furnace body therein. In the use process of a high-temperature furnace body, the temperature condition near the furnace body is relatively harsh for other components and elements. Therefore, it is necessary to isolate the surrounding environment from other parts. In addition, the furnace body as a core component often has to be commissioned and maintained separately during production and use. In existing products, the furnace body is often locked together with other parts. Consequently, the entire machine has to be disassembled once any problem occurs, greatly increasing maintenance cost.

SUMMARY OF THE INVENTION

The object of the present disclosure is to provide a modularly assembled high-temperature dry block temperature calibrator that is convenient to assemble and disassemble.

The present disclosure provides a high-temperature dry block temperature calibrator for temperature calibration of a high-temperature element under test. The high-temperature dry block temperature calibrator comprises:
   a high-temperature furnace body (1) and a control board module (2), which are independently assembled on an instrument lower support (5) and located in a cover body of an instrument outer cover (6) assembled above the instrument lower support (5) and engaged in a periphery direction; and
   a system board module (3) assembled on a side surface of the instrument outer cover (6).
   There is spacing between the high-temperature furnace body (1) and the control board module (2), a jack for receiving the element under test is arranged on the top surface of the instrument outer cover (6) at a position corresponding to a furnace opening of the high-temperature furnace body (1), and there is spacing between the instrument outer cover (6) and the outer periphery of the high-temperature furnace body (1), and a set of side ventilation slots (61) is arranged on a side surface of the instrument outer cover (6) near the top.
   The high-temperature dry block temperature calibrator further comprises a measurement board module (4) assembled on the instrument outer cover (6) and connected with the instrument lower support (5), and there is a spacing between the measurement board module (4) and the control board module (2).
   The high-temperature dry block temperature calibrator further comprises a protective apparatus (7) arranged at the top of the instrument outer cover (6), wherein a top protective plate of the protective apparatus (7) is provided with a hole corresponding to the furnace opening of the high-temperature furnace body (1) and the jack at the top of the instrument outer cover (6) in order to receive the element under test, and the side surfaces of the protective apparatus (7) are open or are ribbed plates with air outlets.
   The high-temperature furnace body (1) comprises:
      a base (11) arranged at the bottom of the high-temperature furnace body (1);
      a thermostatic block (13) and a heat-insulating cylinder (14) which are fixed on the base (11), wherein the heat-insulating cylinder (14) is disposed on the outer periphery of the thermostatic block (13) with certain spacing from the thermostatic block (13) to form a cooling channel (C1) there; and
      a cooling fan (16) mounted in a cavity of the base (11);
      the base (11) is provided with ventilation holes in communication with the cooling channel (C1), and the cooling fan (16) is in communication with the cooling channel (C1) through the ventilation holes.
   The heat-insulating cylinder (14) comprises an inner cylinder (14-1) and an outer cylinder (14-2) sleeved outside the inner cylinder (14-1), and the inner cylinder is an sealed double-layer structure, which is a hollow heat-insulating cylinder consisting of an inner wall, an outer wall and closure plates at the two ends; the inner cylinder (14-1) is arranged outside the thermostatic block (13) with certain spacing from the thermostatic block (13) to form a cooling channel (C1), the outer cylinder (14-2) is arranged around the inner cylinder (14-1) and a spacing therebetween forms a secondary cooling channel (C2), and the bottom of the inner cylinder (14-1) and the bottom of the outer cylinder (14-2) are fixed on the base (11) of the high-temperature furnace body (1); the top of the inner cylinder (14-1) and the top of the outer cylinder (14-2) are engaged by means of a positioning block (15), which is provided with an airflow outlet (15-2) in communication with the cooling channel (C1) and the secondary cooling channel (C2).
   The end surface of the base (11) where the heat-insulating cylinder (14) is fixed is provided with a support column mounting hole (11-2) for mounting a support column (20) that supports the thermostatic block (13), the top end of the support column (20) is fixedly connected with the thermostatic block (13), and the bottom end of the support column (20) is engaged in the support column mounting hole (11-2); the lower part of the positioning block (15) is provided with an alignment slot (15-3), and the upper end of a heating rod (12) on the thermostatic block (13) is engaged in the alignment slot (15-3).
   The base (11) has a box structure, a ribbed bracket (11-1) is arranged on the top end surface of the base (11) where the heat-insulating cylinder (14) is fixed, the clearance areas between the ribs are in communication with an inner cavity of the box body of the base (11), the ribbed bracket (11-1) is in a bridge arch shape and arches from the side edges to the central part, and the support mounting hole (11-2) is arranged on the ribbed bracket (11-1).
   A plurality of strip-shaped bosses (11-5) are distributed on the end surface of the base (11) where the heat-insulating cylinder (14) is fixed, and the outer cylinder (14-2) is sleeved outside of the strip-shaped bosses (11-5) from top to bottom.
   A plurality of outer cylinder stop blocks (11-6) are uniformly distributed or symmetrically arranged among the strip-shaped bosses (11-5), and the outer cylinder stop blocks (11-6) are located inside or outside of the outer cylinder (14-2).

A plurality of protrusions (11-3) are distributed on the edges of the ribbed bracket (11-1), and the inner cylinder (14-1) is sleeved outside the protrusions (11-3) from top to bottom and fixed with the protrusions (11-3); there is spacing between the protrusions (11-3) and the strip-shaped bosses (11-5), and the spacing matches the spacing between the outer cylinder and the inner cylinder.

A through-slot (11-4) in communication with the inner cavity of the box body of the base (11) is provided in an area of the base (11) that corresponds to the area between the outer cylinder (14-2) and the inner cylinder (14-1), and the through-slot (11-4) is in communication with the secondary cooling channel (C2).

The high-temperature dry block temperature calibrator further comprises:
   an air valve fixed in the inner cavity of the box body of the base (11) and located above the cooling fan (16).

The base (11) extends toward one side and thereby forms a plane, one or more vents (11-7) are arranged on the plane, and the vents communicate with the external air from the bottom of the high-temperature furnace body but do not communicate with the cooling channel (C1).

The control board module (2) comprises:
   a slot-type control board bracket (21), a switching power supply (22) assembled in the slot body of the control board bracket (21), a control board (24) mounted at a top opening of the slot body of the control board bracket (21), and a partition plate (23) mounted between the switching power supply (22) and the control board (24).

The control board module (2) is further provided with a flow guide fan (25) that is fixed at the top of the control board module (2) and in communication with the slot body of the control board module (2), and the instrument lower support (5) below the control board module (2) is provided with a ventilation slot.

The system board module (3) comprises a touch screen panel (35), a touch screen foam (34), a touch LCD (33), a touch LCD bracket (32), and a system board (31), which are sequentially fixed from front to back.

The measurement board module (4) comprises:
   a measurement board (41) provided with a TC socket element (43) and a plurality of test connection terminals (45) thereon; and
   a front panel (42) aligned, superposed and fixed to the measurement board and provided with a socket hole (44) and a plurality of terminal holes (46) that match the TC socket element (43) and the test connection terminals (45).

The TC socket element (43) is a thermocouple cold-end temperature compensation structure, comprising:
   two second soaking blocks (03) spaced apart from each other, each of which is connected with an elastic plate (02) thereon; and
   a cold-end temperature sensor (01) mounted on the upper side of either elastic plate (02), the cold end of the thermocouple (05) is arranged between the elastic plate (02) and the second soaking block (03) and is tightly attached to the elastic plate (02) and the second soaking block (03);
   the thermal capacity of the second soaking block (03) is much larger than the thermal capacity of the elastic plate (02) and the thermal capacity of the cold-end temperature sensor (01).

The elastic plate (02) is an elastomer with small thermal capacity and high thermal conductivity and has an S-shaped structure, the tail end of the elastic plate (02) is fixed to the tail end of the second soaking block (03), the head end of the elastic plate (02) rises up, and the portion close to the head end is freely disposed on the upper surface of the second soaking block (03); heat-conducting adhesive is applied between the two second soaking blocks (03).

The thermocouple cold-end temperature compensation structure further comprises:
   a cap (04) that is a square box and used for receiving the cold-end temperature sensor (01), the elastic plate (02) and the second soaking block (03), wherein the front end of the cap (04) is provided with two sockets corresponding to the position between the elastic plate (02) and the second soaking block (03) so that the cold end of the thermocouple (05) is inserted therein; and
   a lead-out wire terminal (06), with one end plugged on the measurement board (41) and the other end connected with a lead-out wire of the cold-end temperature sensor (01) led out from the tail of the cap (04).

A plastic sleeve or heat-insulating adhesive is provided with at the portion that the cold-end temperature sensor (01) mounted on the elastic plate (02) is not in contact with the elastic plate (02); the cold-end temperature sensor (01) is adhered to the elastic plate (02) by adhesive, and a protective plate is respectively provided at both sides of the elastic plate (02) where it is bonded to the cold-end temperature sensor (01).

The lower end of the instrument outer cover (6) is open, and the instrument outer cover (6) is integrally arranged on the instrument lower support (5) and engaged to the instrument lower support on the periphery; the measurement board module (4) is mounted on a side surface of the instrument outer cover (6), and the system board module (3) is mounted on a side surface of the instrument outer cover.

A set of top ventilation slots (62) is provided on the top surface of the instrument outer cover (6) near the edge sides; the bottom surface and the side surfaces of the instrument lower support (5) are provided with several ventilation slot holes.

The instrument outer cover (6) is made of a plastic material.
   a plurality of assembling holes are distributed on the bottom surface of the instrument lower support (5), and are mounted in alignment with assembling parts (9) horizontally arranged on the high-temperature furnace body (1), the control board module (2), the measurement board module (4) and the instrument outer cover (6).

The control board module (2) is parallel to the high-temperature furnace body (1) in the longitudinal direction, and the adjacent side surfaces of the control board module (2) and the high-temperature furnace body (1) are connected and fixed via assembling parts (9) on the sides of the furnace body (9).

The left and right sides of the system board module (3) are respectively connected to the instrument outer cover (6) by screws, and the top of the measurement board module (4) is fixed to the instrument outer cover (6) by screws.

With the above design, the modules constituting the high-temperature dry block temperature calibrator in the present disclosure are independent from each other and can be disassembled independently, which is convenient for service and replacement. The components of the high-temperature furnace body are integrated into modules by means of the base, thus it is convenient to disassemble the high-temperature furnace body in the temperature calibrator; in the high-temperature furnace body, the thermostatic block is centered automatically by means of the design of the positioning block and the base support column, thus operation of disassembling for adjustment are avoided; the heat-insulating cylinder is a double-cylinder structure, and has multiple airflow channels for cooling of the furnace body quickly, and the inner cylinder is an sealed double-layer structure, light in weight and has excellent heat insulation performance. The control board module further comprises Bluetooth and Wi-Fi assemblies, which can realize wireless communication. The system board is touch-controlled and is of higher operation efficiency. The design of multiple air channels in the instrument is beneficial for the cooling of the furnace body and the heat dissipation of the entire instrument. The instrument outer cover is made of a plastic material, which is helpful for reducing the weight of the instrument.

BRIEF DESCRIPTION OF DRAWINGS

FIG. 5-2A is an exploded diagram of the high-temperature furnace body structure according to the present disclosure;

FIG. 5-2B is an external diagram of the high-temperature furnace body according to the present disclosure after assembling;

FIG. 5-3 is a schematic diagram of the cross-sectional structure of the high-temperature furnace body and airflow channels according to the present disclosure;

FIG. 5-4A is a top view of the structure of the base in the high-temperature furnace body according to the present disclosure;

FIG. 5-4B is a bottom view of the structure of the base in the high-temperature furnace body according to the present disclosure;

FIG. 5-5 is a schematic diagram of the structure of the bottom of the positioning block in the high-temperature furnace body according to the present disclosure;

FIG. 5-6 is a top view of the base and the outer cylinder of the heat-insulating cylinder in the high-temperature furnace body according to the present disclosure after assembling;

FIG. 5-7A is a schematic diagram of one specific structure of the air valve used in the high-temperature furnace body according to the present disclosure;

FIG. 5-7B is a perspective diagram of one specific structure of the air valve used in the high-temperature furnace body according to the present disclosure;

FIG. 5-7C is an exploded diagram of another specific structure of the air valve used in the high-temperature furnace body according to the present disclosure;

FIG. 5-7D is a perspective diagram of a further specific structure of the air valve used in the high-temperature furnace body according to the present disclosure;

FIG. 5-8 is a schematic diagram of the multiple airflow channels in the high-temperature furnace body according to the present disclosure.

REFERENCE NUMBERS

Figure 1A:
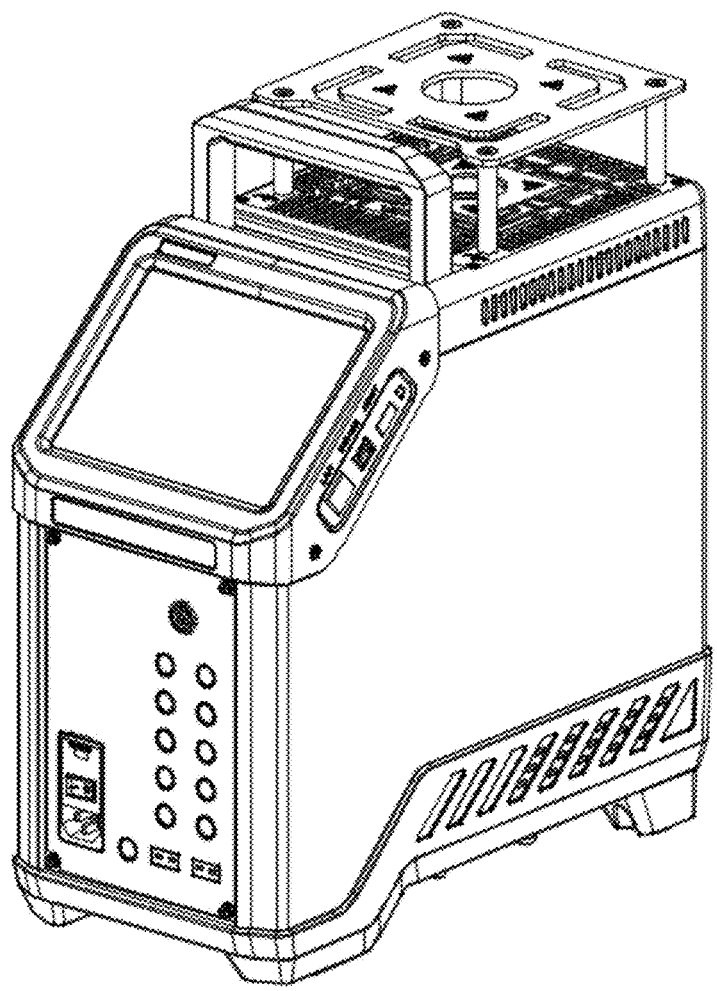
FIG. 1A is a perspective diagram of the appearance of the high-temperature dry block temperature calibrator according to the present disclosure.

Reference numbers of the components of the instrument: high-temperature furnace body 1, control board module 2, system board module 3, measurement board module 4, instrument lower support 5, instrument outer cover 6, protective apparatus 7, assembling part 9;

Reference numbers of the components in the high-temperature furnace body 1: See the sections describing the components;

Reference numbers of the components in the control board module 2: control board bracket 21, switching power supply 22, partition plate 23, control board 24, flow guide fan 25, mounting plate 26;

Reference numbers of the components in the system board module 3: system board 31, touch LCD bracket 32, touch LCD 33, touch screen foam 34, touch screen panel 35, connection port 36, interface hole 37;

Reference numbers of the components in the measurement board module 4: measurement board 41, front panel 42, TC socket element 43, TC socket interface 44, electric measurement post 45, electric measurement post perforation 46;

Reference numbers of components of the TC socket element 43: cold-end temperature sensor 01, elastic plate 02, second soaking block 03, cap 04, socket 041, thermocouple 05, lead-out terminal 06, screw 07;

Reference numbers of the components in the instrument outer cover 6: a set of side ventilation slots 61, a set of top ventilation slots 62.

EMBODIMENTS

Figure 1B:
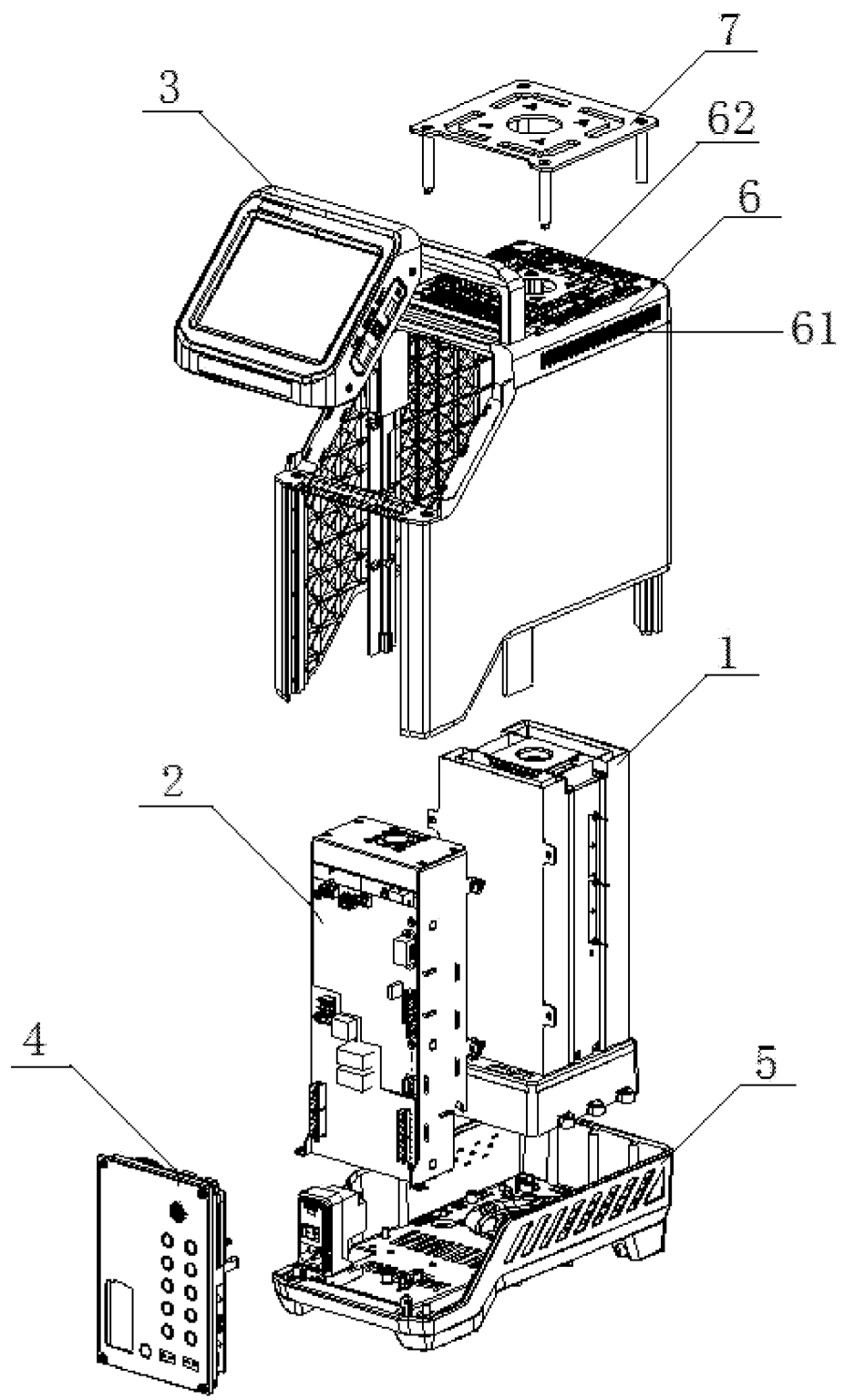
FIG. 1B is an exploded diagram of the structure of the high-temperature dry block temperature calibrator according to the present disclosure.

The present disclosure provides a high-temperature dry block temperature calibrator. The components of the temperature calibrator are in a modular design. FIG. 1B is an exploded view of the high-temperature dry block temperature calibrator, which comprises a high-temperature furnace body 1, a control board module 2, a system board module 3, a measurement board module 4, a lower support 5 and an instrument outer cover 6. The high-temperature furnace body 1, the control board module 2 and the measurement board module 4 are assembled on the lower support 5 sequentially from back to front, the system board module 3 is assembled on the front of the instrument outer cover 6, and the instrument outer cover 6 is assembled above the lower support 5 and accommodates the high-temperature furnace body 1, the control board module 2 and the measurement board module 4 therein. More preferably, to prevent the operator from being scalded by the high temperature of the high-temperature furnace body 1 during the use of the instrument, a protective apparatus 7 is arranged at the topmost portion of the instrument outer cover 6. The appearance of the assembled instrument is shown in FIG. 1A.

The components constituting the high-temperature dry block temperature calibrator are as follows:

High-Temperature Furnace Body

Figures 1, 5:
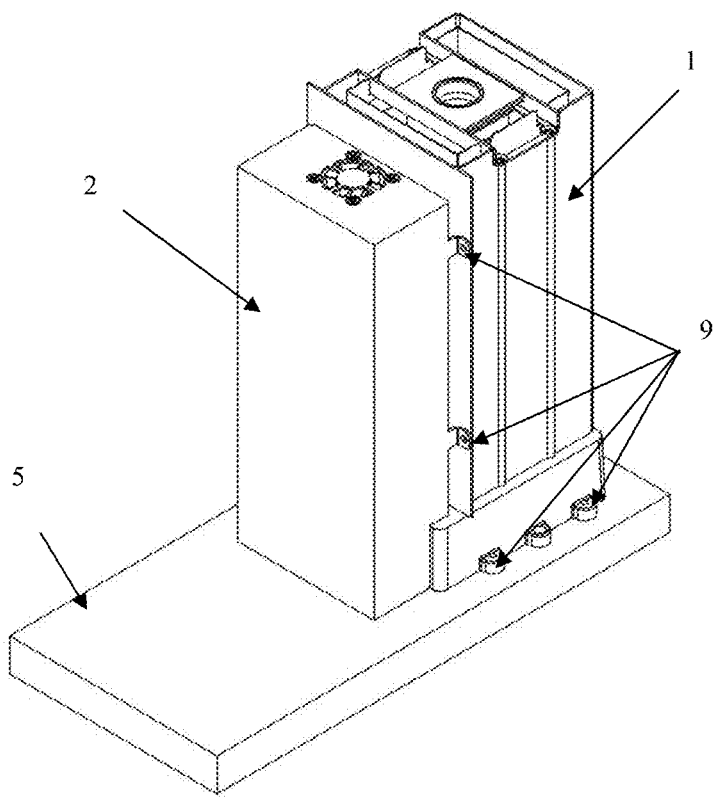
FIG. 5-1 is a schematic diagram of the installation of high-temperature furnace body and peripheral components in the temperature calibrator according to the present disclosure.
Figures 2A, 5:
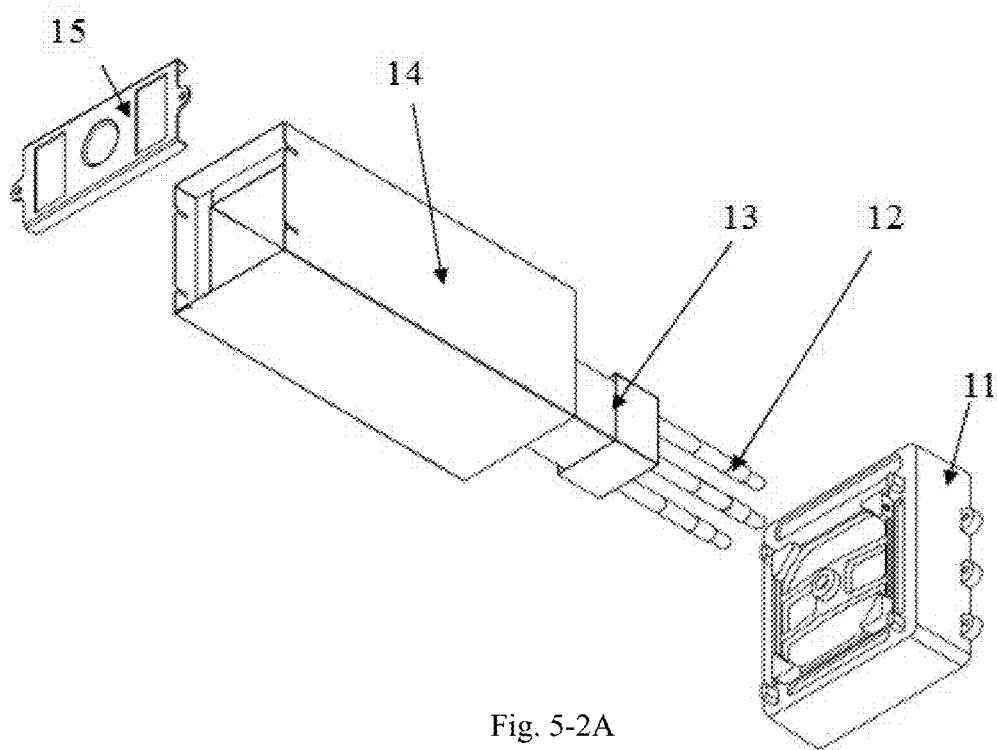
Figures 2B, 5:
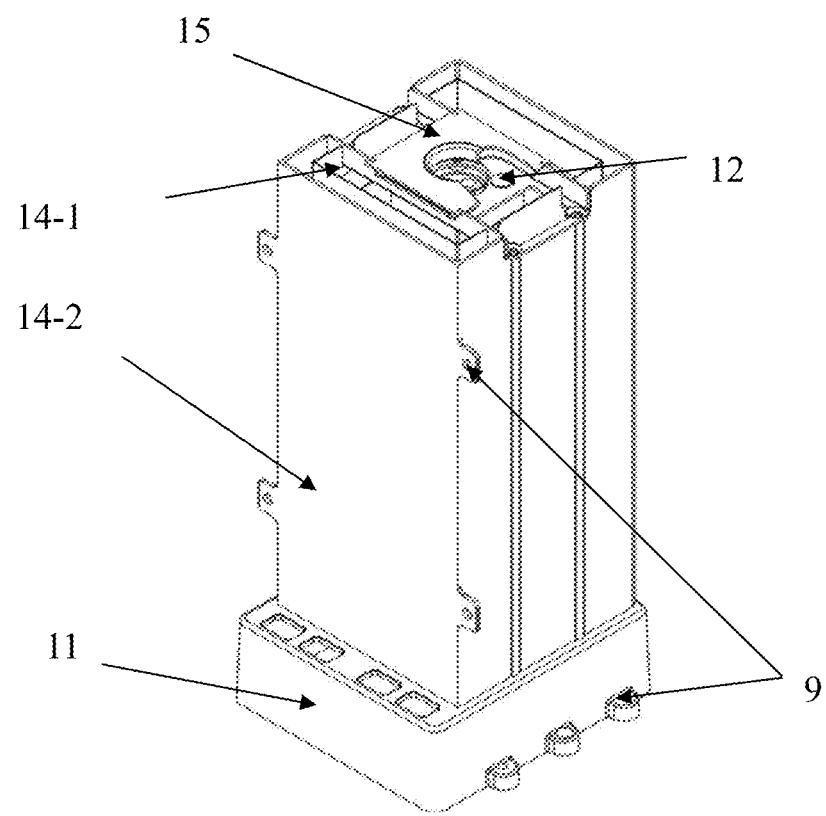

In the high-temperature dry block temperature calibrator, the high-temperature furnace body is configured to provide a stable temperature environment. The high-temperature furnace body 1 is in a modular design, and is fixed with the adjacent control board module 2 and the instrument lower support 5 in the high-temperature dry block temperature calibrator by assembling parts 9 (e.g., screws), so that the high-temperature furnace body 1 can be conveniently and quickly assembled and disassembled, as shown in FIG. 5-1.

Reference numbers of the components of the high-temperature furnace body 1 in the present disclosure:

base 11, heating rod 12, thermostatic block 13, heat-insulating cylinder 14, positioning block 15, cooling fan 16, air valve 17, air valve II 18, air valve III 19, support column 20;

Reference numbers of the components of the base 11: ribbed bracket 11-1, support column mounting hole 11-2, protrusion 11-3, through-slot 11-4, strip boss 11-5, outer cylinder stop block 11-6, vent 11-7, positioning pin hole 11-8;

inner cylinder 14-1, outer cylinder 14-2, rapid cooling channel C1, secondary cooling channel C2, heat dissipation channel C3, Reference numbers of the components of the positioning block 15: central hole 15-1, airflow outlet 15-2, alignment slot 15-3;

Reference numbers of the components of the air valve 17: frame 17-1, blade 17-2, link rod 17-3, motor 17-4, motor mounting plate 17-5, mounting hole 17-6, blade crankshaft 17-7, blade shaft 17-8, motor crankshaft 17-9, limit posts 17-10 and 17-11, hook 17-12;

Reference numbers of the components of the air valve II 18: support frame 18-1, movable air deflector 18-2, fixed air deflector 18-3, rotating shaft 18-4, central shaft 18-5;

Reference numbers of the components of the air valve III 19: support frame 19-1, plate-shaped air deflector 19-2.

Figure 2A:
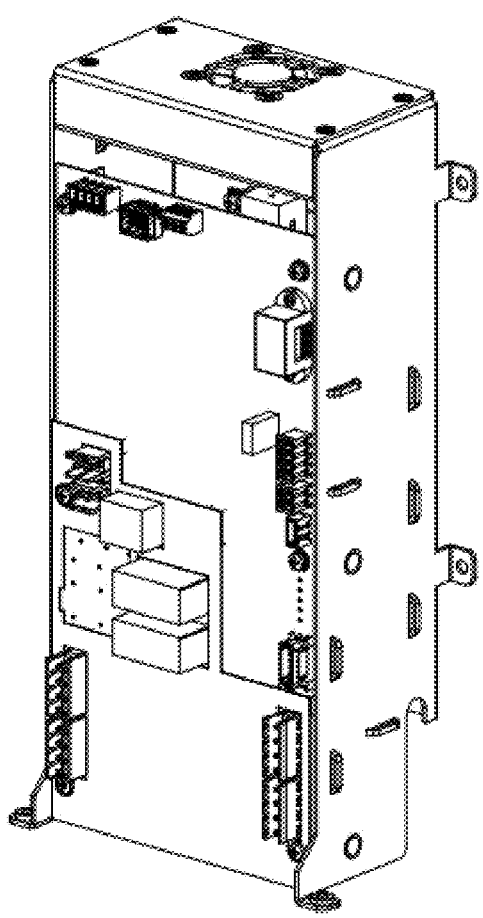
FIG. 2A is a perspective diagram of the control board module in the high-temperature dry block temperature calibrator according to the present disclosure.
Figure 2B:
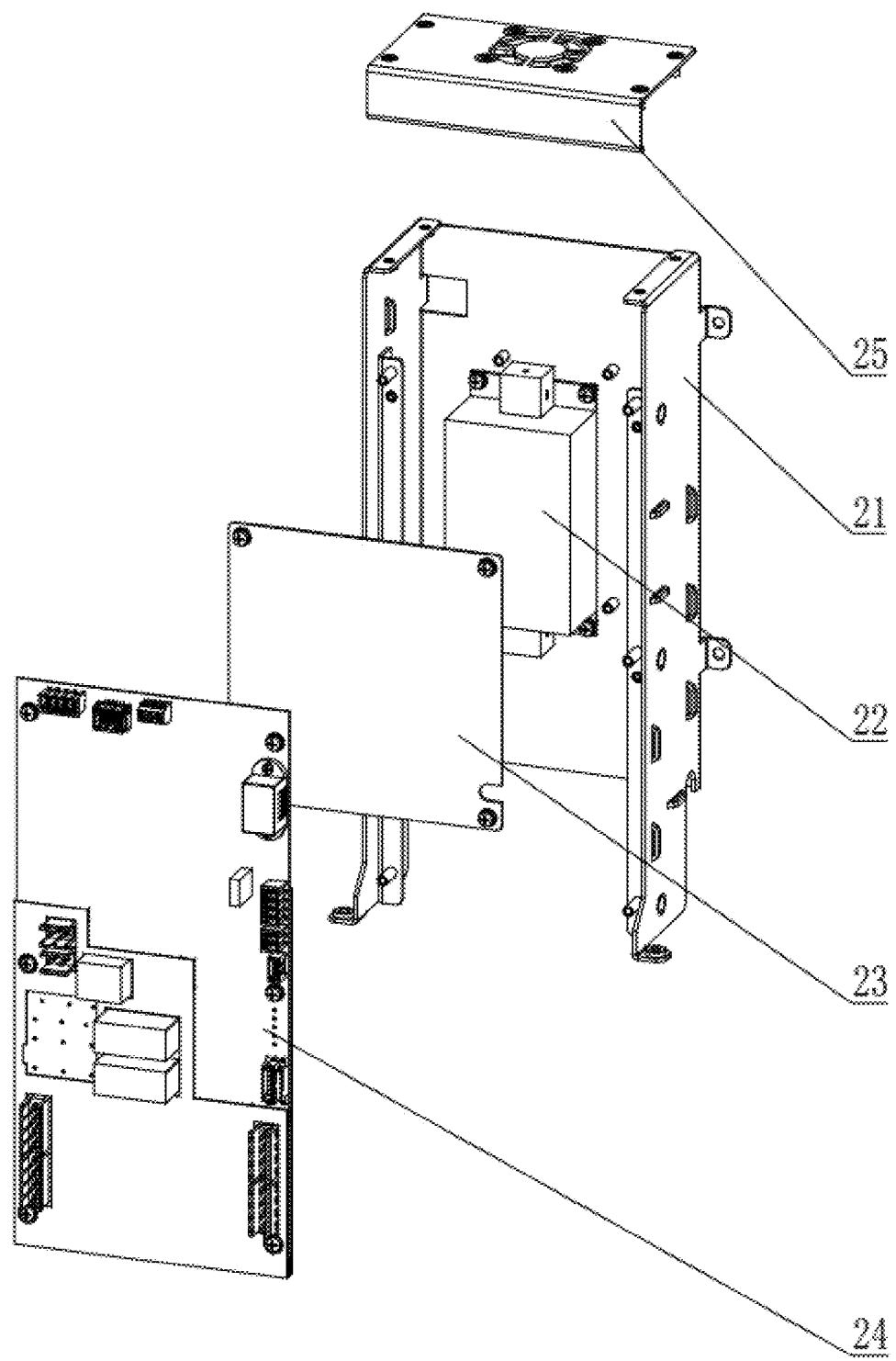
FIG. 2B is an exploded diagram of the consisting components of control board module in the high-temperature dry block temperature calibrator according to the present disclosure.

As shown in FIGS. 5-2A and 5-2B, the high-temperature furnace body 1 comprises a base 11 arranged at the bottom, a thermostatic block 13 arranged on the upper part of the base, heating rods 12, a heat-insulating cylinder 14 arranged on the periphery of the thermostatic block, and a positioning block 15 arranged at the top. The heating rods 12 are mounted inside the thermostatic block 13 and are heating elements for the furnace body; the heat-insulating cylinder 14 is arranged on the periphery of the thermostatic block 13 and spaced apart from the thermostatic block; the base 11 is a mounting base for the heat-insulating cylinder 14 and the thermostatic block 13; the positioning block 15 is connected to the upper part of the heat-insulating cylinder 14 and is aligned and engaged to the heating rods 12 in the thermostatic block 13 (see FIG. 2B).

Figure 4A:
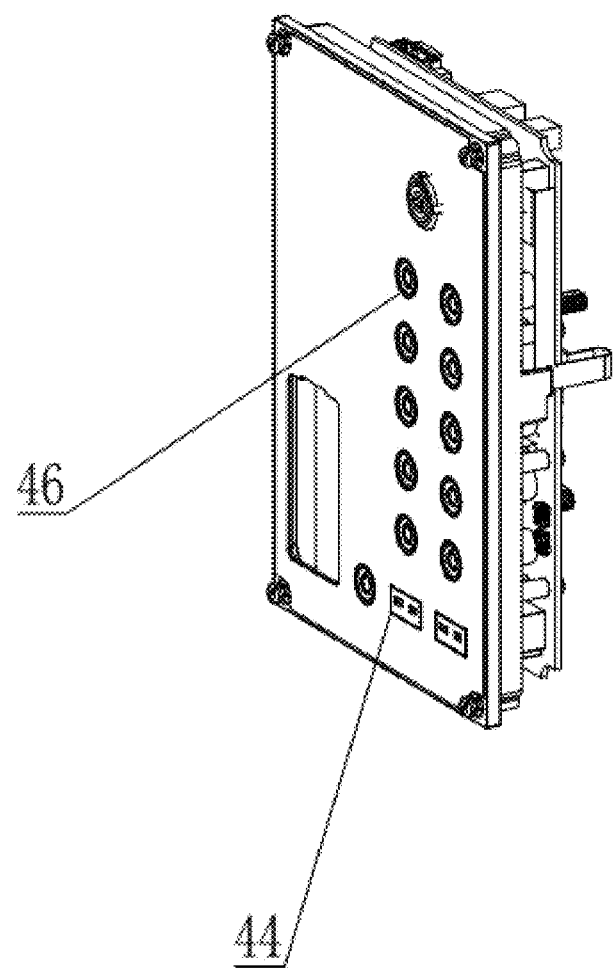
FIG. 4A is a perspective diagram of the measurement board module in the high-temperature dry block temperature calibrator according to the present disclosure.
Figure 4B:
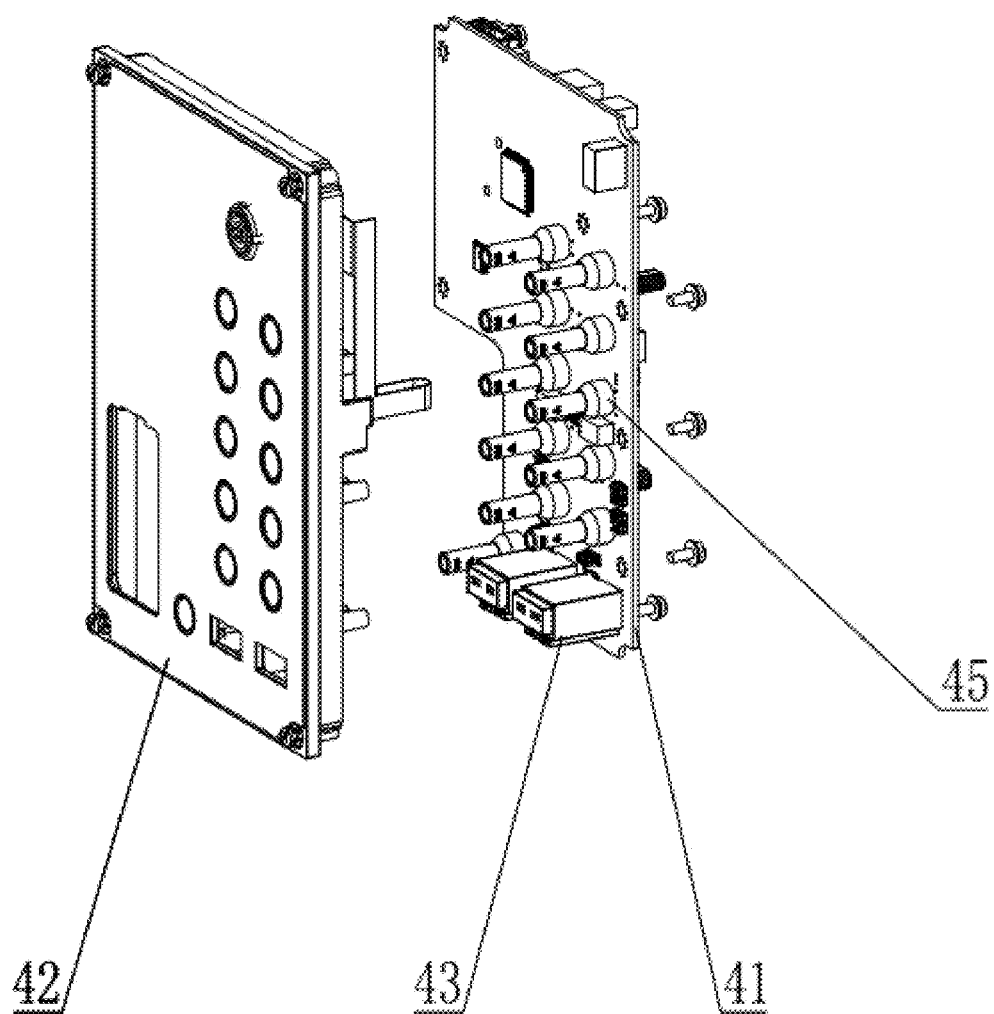
FIG. 4B is an exploded diagram of the consisting components of the measurement board module in the high-temperature dry block temperature calibrator according to the present disclosure.
Figure 4C:
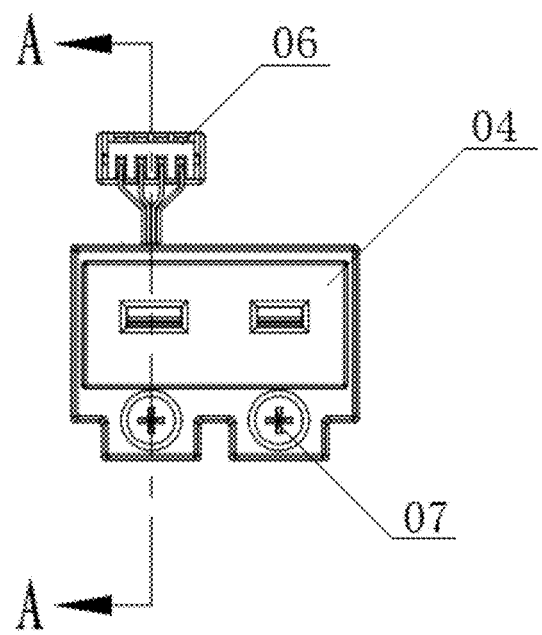
FIG. 4C is a front view of the thermocouple cold-end temperature compensation structure in the measurement board module.

Further in conjunction with FIGS. 5-3, 5-4A and 5-4B, the base 11 is in a box-shaped structure with a downward opening, and serves as a mounting base for the heat-insulating cylinder 14 and the thermostatic block 13, and the cooling fan 16 is mounted in a cavity at the lower part of the box body. In a preferred embodiment of the furnace body in the present disclosure, an air valve 17 is further provided in the high-temperature furnace body 1 to block the airflow from the space below the furnace body (even when the cooling fan 16 is off). The air valve 17 and the cooling fan 16 are assembled in the box cavity of the base 11, the air intake direction is upward, and the air valve 17 is located above the cooling fan 16. Guiding and positioning structures for installing the cooling fan 16 and the air valve 17 are provided in the box body of the base 1. For example, as shown in FIG. 5-4B, a plurality of limit protrusions 11-10 (e.g., 6 limit protrusions) are formed on the surface of the cavity at the lower part of the base 11 for limiting and guiding the air valve 17 in the process of installation of the air valve 17, so that the air valve 17 can be positioned at a corresponding position in the cavity at the lower part of the base 11 (e.g., a position opposing to the thermostatic block 13 mounted on the upper part of the base 11); in a case that the frames of the air valve 17 and the cooling fan 16 are designed in a square shape, mounting holes are arranged at all four corners of the frames, four threaded holes are arranged at corresponding positions inside the base 11, and the air valve 17 and the cooling fan 16 are fixed together in the inner cavity of the box body of the base 11 by screws.

Continuing referring to FIG. 5-4A, the top end face of the base 11 in a box structure is provided with a ribbed bracket 11-1, the clearance area between the ribs is in communication with the inner cavity of the box body, a support column mounting hole 11-2 is arranged at the center of the ribbed bracket 11-1 for mounting a support column 20, a support column 20 supports the thermostatic block 13. The support column mounting hole 11-2 may be designed into an oblate shape to engage the support column 20, and the support column 20 is fixedly connected with the lower part of the thermostatic block 13. More preferably, the ribbed bracket 11-1 is in a bridge arch shape, which arches from the side edges to the center part, so as to facilitate supporting and fixing of the support column 20, as well as to improve the stress condition of the ribbed bracket 11-1 and to reduce deformation of the ribbed bracket 11-1. The structure of the ribbed bracket 11-1 is such optimized so as to increase the airflow intensity, increase the area of the airflow channels, and reduce the airflow resistance. The arched central part is also helpful for increasing the spacing from the air valve 17 and the center of the cooling fan 16 mounted on the lower part of the bracket 11, which is helpful for reducing the working temperature of the air valve 17, especially the motor at the central part of the cooling fan 16.

In the furnace body base 11, for the ribbed bracket 11-1 there may be a variety ways of arranging ribs, each of which requires arranging a support column mounting hole 11-2 on the ribbed bracket 11-1.

Two positioning pin holes 11-8 are arranged in the horizontal direction at middle positions of the two opposite sides at the bottom of the furnace body base 11 for guiding and precise positioning when the high-temperature furnace body 1 is mounted on the instrument lower support 5. The assembling parts 9 for connecting the base 11 with the instrument lower support 5 can be arranged in the horizontal direction at both sides of the positioning pin hole 11-8, and the base 11 is connected with the instrument lower support 5 by means of the four assembling parts 9 in the horizontal direction at the bottom of the base 11 (see FIG. 5-1).

Figures 3, 5:
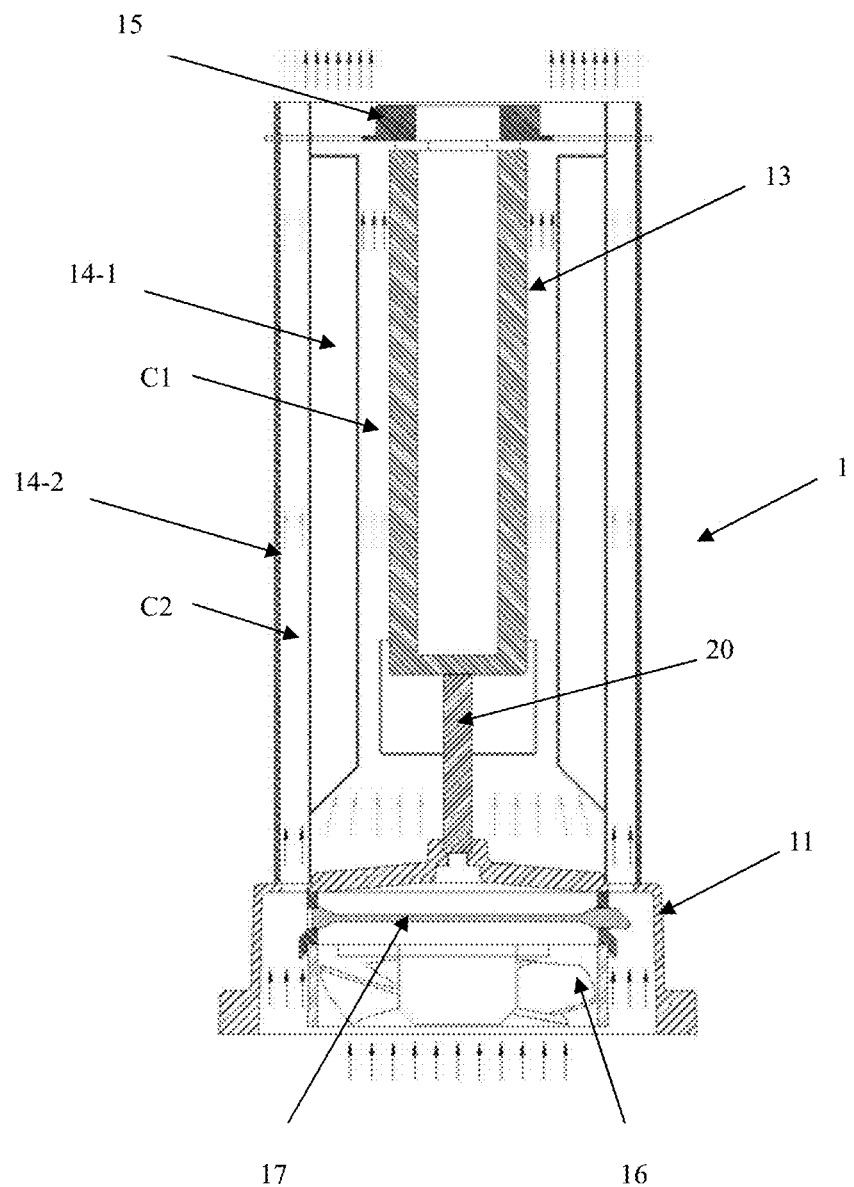
Figures 4A, 5:
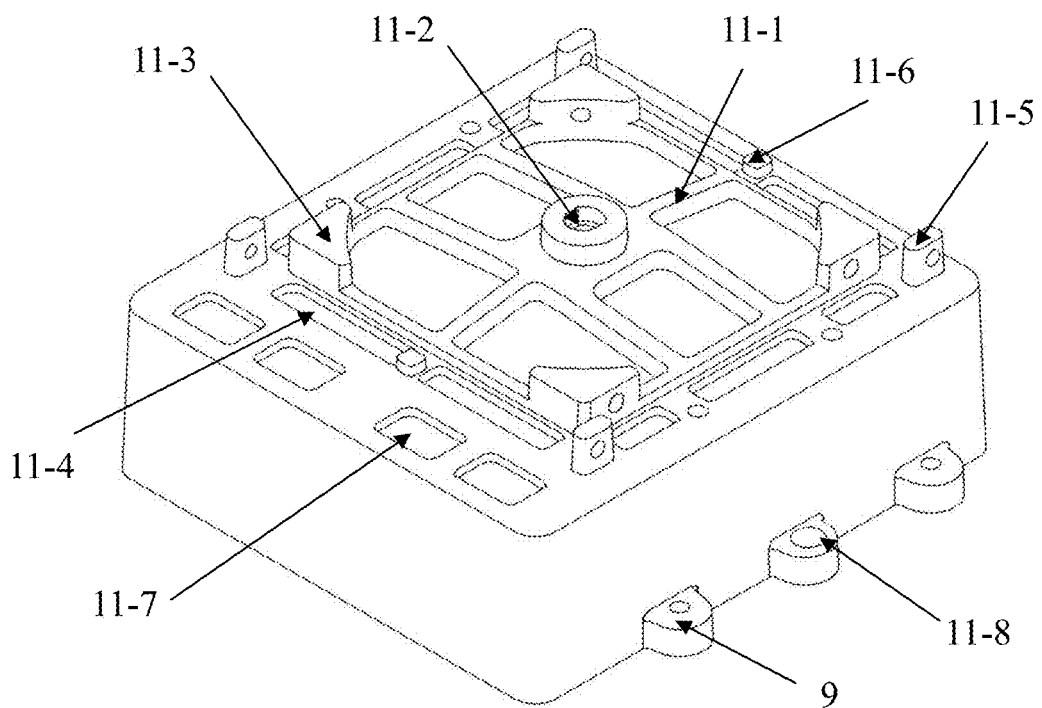
Figures 4B, 5:
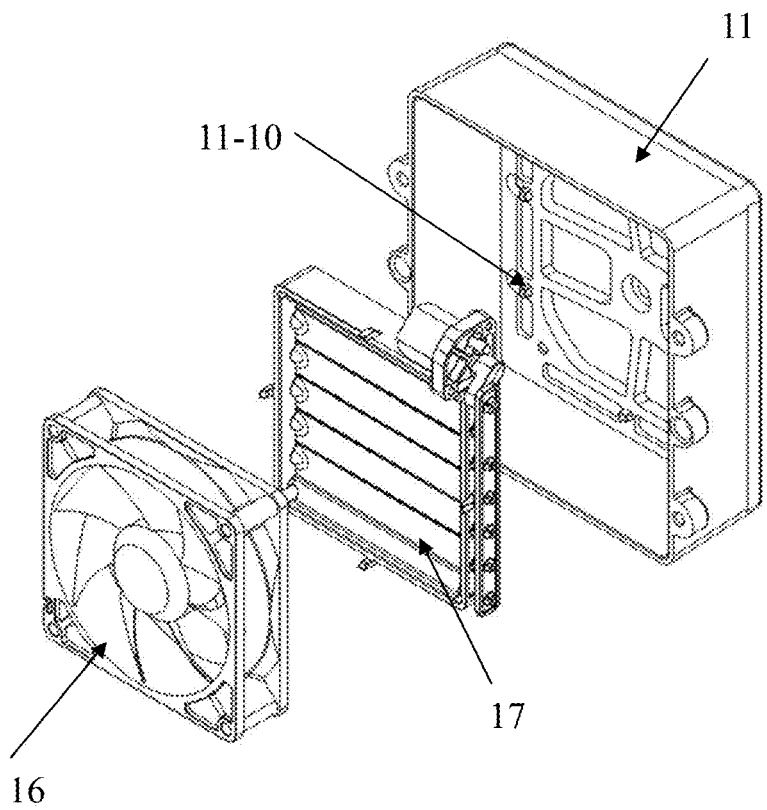
Figure 5:
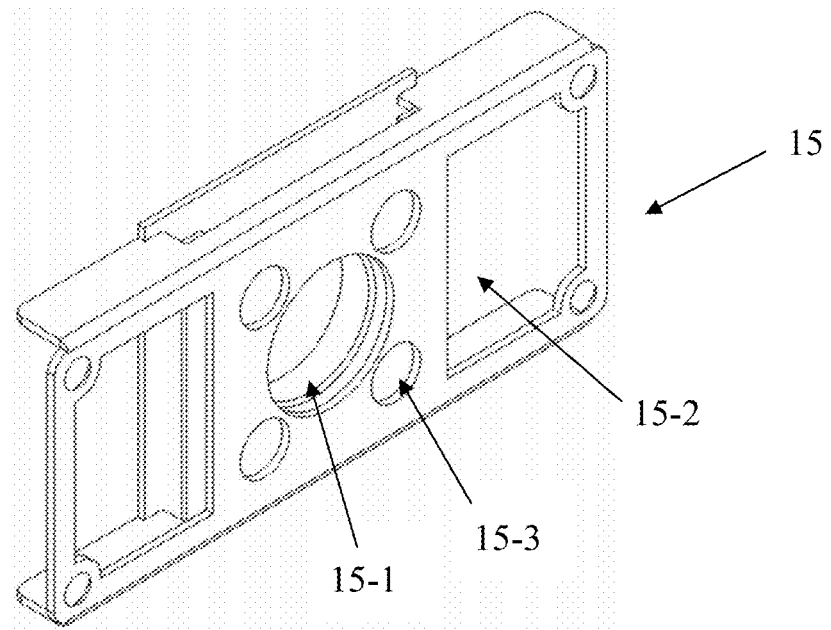

As shown in FIGS. 5-3 and 5-2B, the heat-insulating cylinder 14 consists of an inner cylinder 14-1 and an outer cylinder 14-2. Refer to FIG. 5-2B, the inner cylinder 14-1 is a sealed double-layer structure consisting of an inner wall, an outer wall and closure plates at the two ends. Those components form a hollow heat-insulating cylinder, which can utilizes the static air between the two layers as a heat-insulating zone, and not only has the characteristics of light weight and excellent heat insulation performance, but also can effectively reduce the heat transfer of the thermostatic block 13 to the surrounding parts and greatly reduce the temperature of the surrounding parts; the outer cylinder 14-2 is in a single-layer plate structure to facilitate quick heat dissipation. The inner cylinder 14-1 is arranged outside the thermostatic block 13 and spaced from the thermostatic block 13, the outer cylinder 14-2 is arranged outside the inner cylinder 14-1 and spaced from the inner cylinder 14-1, the bottom of the inner cylinder 14-1 and the bottom of the outer cylinder 14-2 are fixed on the upper surface of the furnace body base 11, and the top of the inner cylinder 14-1 and the top of the outer cylinder 14-2 are engaged by the positioning block 15, which is provided with airflow outlets 15-2 (see FIGS. 5-5 and 5-6). There is no particular restriction on the specific shape of the positioning block 15 in the embodiments of the present disclosure, as long as the engaging function is realized; one or two fixing holes for fixing with the high-temperature furnace body 1 may be arranged at the two ends of the positioning block 15 respectively. As shown in FIG. 5-4A, four strip-shaped bosses 11-5 are distributed on the outer periphery of the upper surface of the furnace body base 11. The four strip bosses 11-5 are same in the length direction and are used for guiding, positioning and fixing the outer cylinder 14-2 of the heat-insulating cylinder 14, and the outer cylinder 14-2 is sleeved outside the strip-shaped bosses 11-5 from top to bottom; to guide the installation of the outer cylinder 14-2 better, outer cylinder stop blocks 11-6 may be further arranged in circumferential connecting lines of the four strip bosses 11-5 distributed on the upper surface of the furnace body base 11, so as to limit and correct the deformation of the outer cylinder 14-2. Preferably, each outer cylinder stop block 11-6 is arranged at the middle position of a connecting line of every two adjacent strip-shaped bosses 11-5, and is positioned inside or outside of the outer cylinder 14-2. In a case that a plurality of outer cylinder stop blocks 11-6 are arranged, the outer cylinder stop blocks on opposite edges are preferably arranged symmetrically, and some of the outer cylinder stop blocks may be arranged inside of the outer cylinder 14-2, while the others of the outer cylinder stop blocks may be arranged outside of the outer cylinder.

Continuing to refer to FIGS. 5-3 and 5-2B, four protrusions 11-3 are distributed on the edges of the ribbed bracket 11-1 on the upper surface of the furnace body base 11, and a mounting hole is formed on the outer side of each protrusion 11-3, for positioning and fixing the inner cylinder 14-1 of the heat-insulating cylinder 14. The inner cylinder 14-1 is sleeved outside the protrusions 11-3 from top to bottom, and is fixed to the base 11 by penetrating fixing bolts through the mounting holes formed in the protrusions 11-3. The protrusions 11-3 for fixing and positioning the inner cylinder 14-1 are spaced from the strip-shaped bosses 11-5 for guiding, positioning and fixing the outer cylinder 14-2 with certain spacing, the spacing matches the spacing between the outer cylinder 14-2 and the inner cylinder 14-1. Through-slots 11-4 communicating with the cavity at the lower part of the base 1 are formed in a region of the base 11 around the ribbed bracket 11-1 within the spacing. There is no particular restriction of the through-slots 11-4 on the lengths, quantity and positions in the region, but preferably a plurality of through-slots 11-4 are arranged and distributed evenly.

In that way, the heat-insulating cylinder 14 and the thermostatic block 13 together form two separate air channels, wherein a cooling channel C1 is formed as the clearance between the inner side surface of the inner cylinder 14-1 and the outer side surface of the thermostatic block 13. When the furnace body needs to be cooled, the cooling fan 16 below operates to blow a large amount of high-speed cold air through the thermostatic block 13 and the inner wall of the inner cylinder 14-1, and the heat is discharged upward via the airflow outlets 15-2 of the positioning block 15 through the cooling channel C1. A secondary cooling channel C2 is formed as the clearance between the outer side surface of the inner cylinder 14-1 and the inner side surface of the outer cylinder 14-2, and air from the space below the furnace body enters the secondary cooling channel C2 through the through-slots 11-4 to further cool the inner cylinder 14-1 by natural convection, thereby attaining a purpose of effectively controlling the temperature of the wall of the outer cylinder 14-2. FIG. 5-3 shows a schematic cross-sectional view of the furnace body and the distribution of cooling airflow.

In order to maintain the temperature stability of the furnace body better, in a preferred embodiment of the present disclosure, an air valve 17 is installed in the high-temperature furnace body 1 shown in FIG. 5-3. The function of the air valve 17 is to cut off the air convection path of the rapid cooling channel C1 around the thermostatic block 13 and prevent the convection air from affecting the temperature field of the thermostatic block 13. Any air valve structure capable of achieving this function may be used in the high-temperature furnace body 1 in the present disclosure. As a specific example, FIGS. 5-7A and 5-7B show a specific structure of the air valve 17, which doesn't constitute any limitation to other configurations of the air valve 17. For example, the shape of the furnace body or the form of the blades, etc. may be changed according to the shape of the furnace body.

The air valve 17 shown in FIGS. 5-7A and 5-7B comprises a frame 17-1, a plurality of blades 17-2 arranged parallel to each other in the frame, a link rod 17-3 connected with the plurality of blades, and a driving apparatus connected with the link rod, such as a motor 17-4 fixed to the frame 17-1.

Specifically, the frame 17-1 is in a square shape, and a plurality of through-holes opposite to each other are formed on two opposite side walls of the frame 17-1, so that the blades 17-2 positioned between the two side walls are allowed to pass through the through-holes and then be erected on the two side walls. One of the two side walls with the through-holes extends to form a motor mounting plate 17-5 for mounting the motor 17-4, and the motor mounting plate 17-5 and the frame may be integrally formed or fixedly connected to each other. Mounting holes 17-6 are formed at the four corners of the frame 17-1 for connecting and mounting to the bottom of the high-temperature furnace body 1, the side length of the square frame matches the frame at the bottom of the high-temperature furnace body 1, and is in a range of 60 mm to 120 mm, so that the air valve matches the furnace body of the dry block temperature calibrator in size; in an embodiment, the bottom of the high-temperature furnace body 1 is in a square shape, and the frame 17-1 of the air valve is also in a square shape and has 92 mm side length; in another embodiment, as shown in FIG. 5-7B, hooks 17-12 are formed respectively on the outer surfaces of one or more of the four side walls of the frame 17-1 for guiding and positioning the cooling fan 16 during installation.

The blades 17-2 are rectangular thin plates, crankshafts 17-7 are arranged at one end of the blades (the end close to the link rod 17-3), blade shafts 17-8 are arranged at the other end of the blades, and the blade crankshaft 17-7, the blade 17-2 and the blade shaft 17-8 are integrally formed. The blade shaft 17-8 and the blade crankshaft 17-7 at the both ends of each blade 17-2 are respectively engaged into opposite through-holes on the two side walls of the frame 17-1, so that the blades 17-2 are erected in the frame 17-1 and can rotate freely. There is no particular restriction on the quantity of the blades 17-2; in a specific embodiment, preferably five blades are provided.

The link rod 17-3 is provided with a plurality of through-holes, and the quantity of the through-holes is the same as that of the blades 17-2, and the blade crankshafts 17-7 at one end of the blades are engaged into the through-holes of the link rod. The plurality of blades 17-2 are connected to the link rod 17-3 in the same way, and the movement of the link rod 17-3 drives the plurality of blades 17-2 to rotate together, so that the plurality of blades 17-2 move synchronously.

The motor 17-4 is mounted on the motor mounting plate 17-5, one end of the motor crankshaft 17-9 is fixed to the rotating shaft of the motor, and the other end of the motor crankshaft 17-9 is connected with the link rod 17-3. On the motor mounting plate 17-5 and the air valve frame 17-1, limit posts 17-10 and 17-11 are provided respectively for limiting the two limit positions of the rotation of the motor crankshaft 17-9 and thereby limiting the rotation angle of the rotating shaft of the motor 17-4.

During the use of the air valve 17, driven by the motor 17-4, the motor crankshaft 17-9 rotates around the rotating shaft of the motor, drives the link rod 17-3 to move, and thereby drives the blades 17-2 to rotate synchronously with the motor crankshaft 17-9 via the plurality of blade crankshafts 17-7. In this embodiment, when the motor crankshaft 17-9 rotates to a position where it comes into contact with the limit post 17-11 located on the air valve frame, the blade surfaces of all blades 17-2 are all parallel to the plane of the frame 17-1, and the air valve 17 is in a fully closed state, as shown in FIG. 5-1; when the motor crankshaft 17-9 rotates to a position where it comes into contact with the limit post 17-10 located on the motor mounting plate 17-5, the blade surfaces of all blades 17-2 are all perpendicular to the plane of the frame 17-1, and the air valve 17 is in a fully open state. By precisely controlling the rotation angle of the rotating shaft of the motor 17-4 between the two limit posts 17-10 and 17-11, the rotation angle of the blades 17-2 can be precisely controlled by means of the motor crankshaft 17-9, the link rod 17-3 and the blade crankshafts 17-7, thereby the degree of opening of the air valve 17 can be precisely controlled.

Please refer to FIG. 5-7C, an air valve in another structural form is provided and called air valve II 18, which comprises a support frame 18-1, a plurality of air deflectors arranged inside the support frame, and a driving apparatus. The inner edge of the support frame 18-1 is circular, and the air deflectors are fan-shaped, and may be categorized into fixed air deflectors 18-3 and movable air deflector 18-2 that are distributed alternately. The plurality of fixed air deflectors 18-3 are uniformly fixed on the circular inner edge of the support frame 18-1 via the long edge of the fan shape, and the plurality of movable air deflectors 18-2 are uniformly fixed on a central shaft 18-5 via the short edge of the fan shape. The driving apparatus comprises a motor and a rotating shaft 18-4 connected with the motor, wherein the rotating shaft is connected with the rotating shaft 18-4 at the center of the movable air deflectors 18-2 and can drive the plurality of movable fan-shaped air deflectors to rotate. The central shafts 18-5 and the rotating shaft 18-4 are coaxially sleeve-connected, the clearance area between adjacent fixed air deflectors 18-3 matches the fan surfaces of the movable air deflectors 18-2, and the clearance area between adjacent movable air deflectors 18-2 matches the fan surfaces of the fixed air deflectors 18-3. When the fan-shaped fixed air deflectors 18-3 and the fan-shaped movable air deflectors 18-2 are jointed and distributed without shading on each other, the air valve II 18 is in a closed state, and at this point the air valve blocks the airflow from passing through it. When the fan-shaped movable air deflectors 18-2 rotate under the driving of the driving apparatus to a position where the fan-shaped movable air deflectors 18-2 fully or partially overlap the fan-shaped fixed air deflectors 18-3 so that the both are fully or partially shaded by each other, the air valve II 18 is in a fully or partially opened state, and at this point the air valve allows the airflow to pass through it fully or partially.

Please refer to FIG. 5-7D, an air valve in another structural form is provided and called air valve III 19, which comprises a support frame 19-1, a plurality of plate-shaped air deflectors arranged inside the support frame, and a driving apparatus. The support frame 19-1 is square, and a plurality of plate-shaped air deflectors 19-2 are parallel to each other and their side edges are connected sequentially, for example, by hinging, so that the angle between adjacent plate-shaped air deflectors 19-2 may be changed from 0 degree to 180 degrees, thereby the plate-shaped air deflectors are in a tiled state or folded state. Under the driving of the driving apparatus, when the plurality of plate-shaped air deflectors 19-2 form an angle of 180 degrees between each other, i.e., when the plurality of plate-shaped air deflectors are tiled sequentially to form a plane, the air valve III 19 is closed, and the opening inside the support frame 19-1 is fully covered by the plurality of plate-shaped air deflectors 19-2, and at this point the air valve blocks the airflow from passing through it. Under the driving of the driving apparatus, when the angle between the plurality of plate-shaped air deflectors is smaller than 180 degrees, i.e., when the plurality of plate-shaped air deflectors 19-2 are folded to one side, the plurality of plate-shaped air deflectors can't fully cover the opening inside the support frame 19-1, and an opening is formed on one side of the support frame; the air valve III 19 is fully or partially opened according to the opening degree of the opening, and at this point the air valve allows the airflow to fully or partially pass through it.

Similar to the air valve 17, the air valve II 18 and the air valve III 19 may be assembled in the high-temperature furnace body 1 shown in FIGS. 5-3 and 5-4B. They will not be further detailed here.

In order to cooperate with the overall assembly of the temperature calibrator, the high-temperature furnace body 1 in the present disclosure is further optimized on the basis of the above-mentioned form in the modular design:

Please refer to FIG. 5-4A in conjunction with FIGS. 5-2B and 5-8, the upper portion of the base 11 extends to one side to form a plane, on which one or more vents 11-7 are arranged and communicate with the outside air from the space at the bottom of the furnace body, but don't communicate with the cooling channel C1. Thus, when the high-temperature furnace body 1 is mounted in the temperature calibrator, certain spacing exists between the outside of the high-temperature furnace body 1 with vents 11-7 on the base 11 and other components in the instrument, and an airflow channel C3 forms in the spacing, which is favorable for heat dissipation to reduce the effect of the high-temperature furnace body 1 on other components assembled in the instrument, such as the control board module 2 and the like.

Please refer to FIG. 5-4A in conjunction with FIG. 5-1, one or more assembling parts 9 may be horizontally arranged at the bottom of one side of the base 11, so that the base 11 may be fixed to the instrument lower support 5 by the assembling parts 9; the outer cylinder 14-2 of the heat-insulating cylinder also functions as the housing of the high-temperature furnace body 1. The outer cylinder 14-2 is made of an aluminum profile and is manufactured by post-processing. A plurality of lateral assembling parts 9 are arranged on one side of the outer cylinder 14-2 for connecting to other module parts adjacent to the outer cylinder 14-2, such as the control board module 2. Thus, in the compact space of the temperature calibrator, the outer cylinder 14-2 also serves as a support for the control board module 2, and is convenient to assemble and disassemble. The lateral assembling parts 9 are advantageously arranged on the side in the same direction as the vents 11-7 of the base, so that an airflow channel C3 can be formed between the assembled high-temperature furnace body 1 and the control board module 2 to facilitate heat dissipation.

Figures 5, 6:
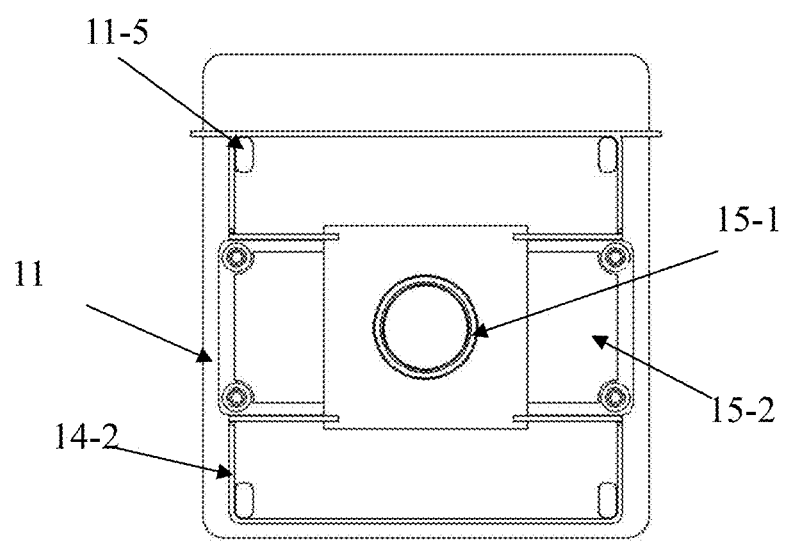
Figures 5, 6, 7, 7A:
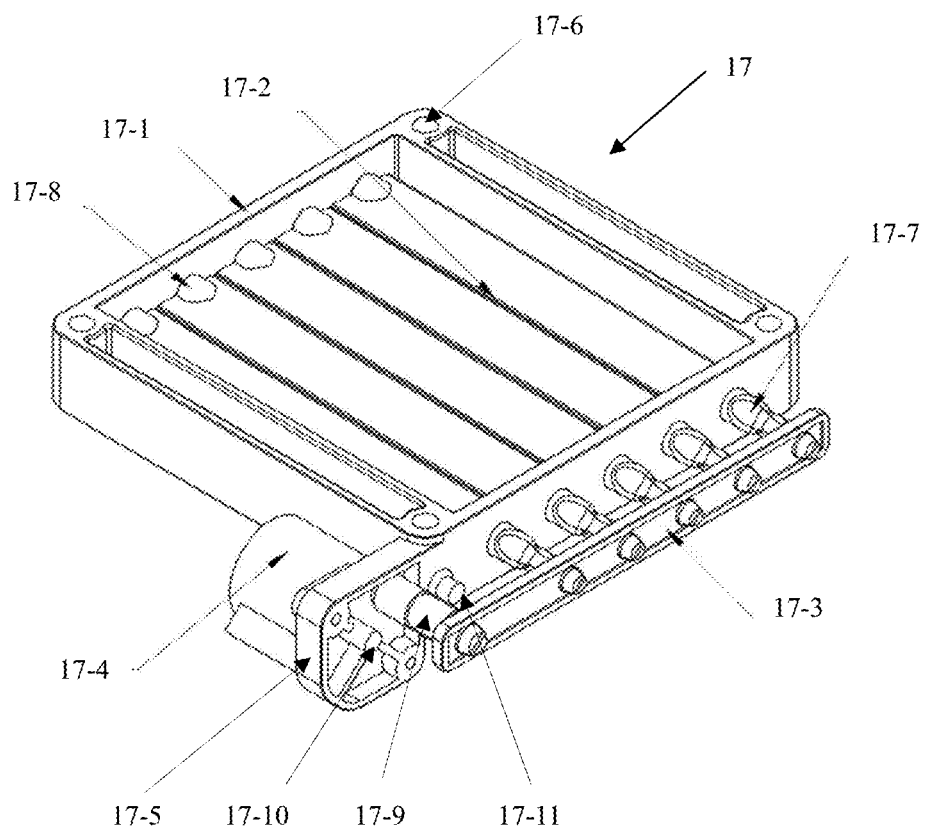
Figures 5, 6, 7, 7B:
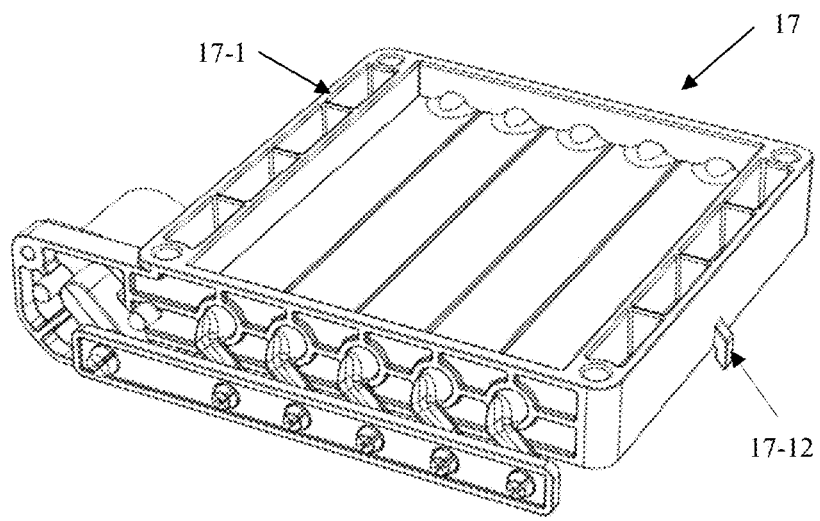
Figures 5, 6, 7, 7C:
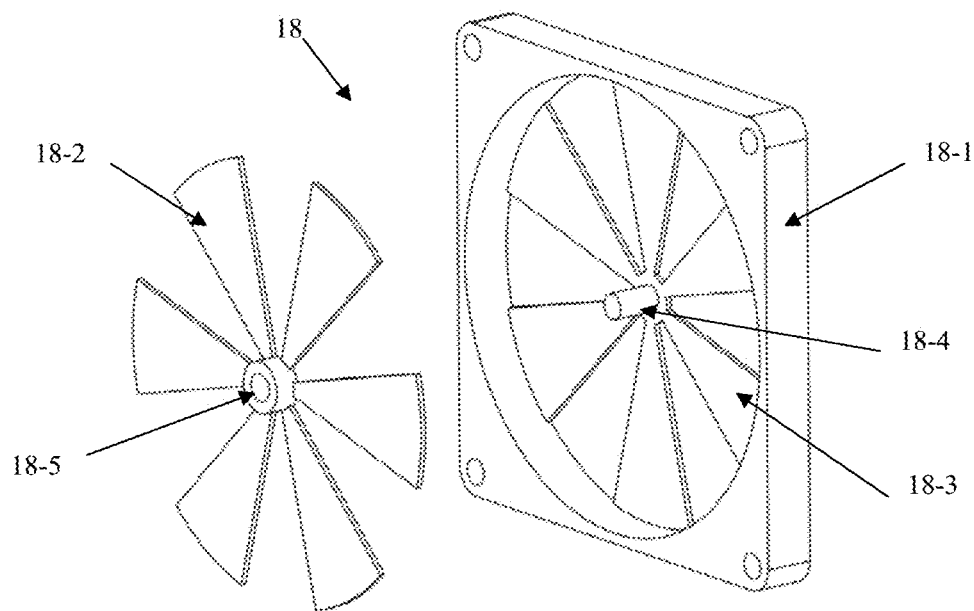
Figures 5, 6, 7, 7D:
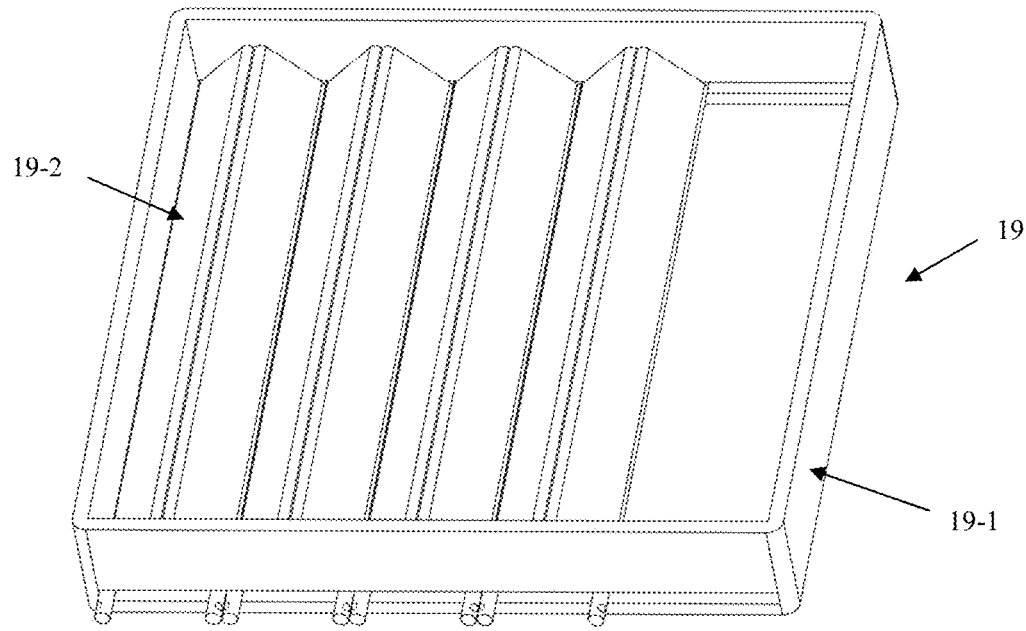
Figures 5, 6, 7, 8:
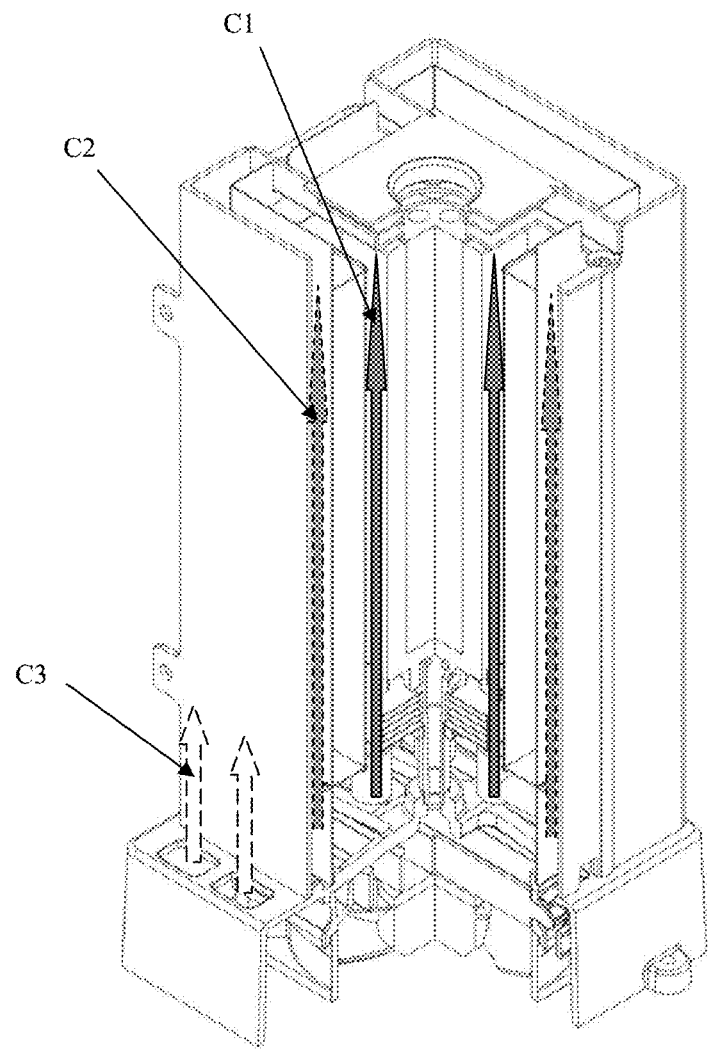

Please refer to FIG. 5-2 in conjunction with FIGS. 5-3, 5-5 and 5-6, the positioning block 15 located on the upper part of the high-temperature furnace body 1 is connected to the outer cylinder 14-2, and centers and straightens the thermostatic block 13 by means of the heating rods 12: the bottom of the positioning block 15 is provided with alignment slots 15-3 corresponding to the heating rods 12, and the quantity and positions of the alignment slots 15-3 completely correspond to the quantity and positions of the heating rods 12, so that the tops of the heating rods 12 assembled in the thermostatic block 13 can rightly extend into the corresponding alignment slots 15-3, thereby the movement of the heating rods 12 and the thermostatic block 13 in the horizontal direction is limited and thus the thermostatic block is centered and straightened; a central hole 15-1 is arranged in the central part of the positioning block 15, and is coaxial and aligned to the central holes of the thermostatic block 13, the soaking block and the protective plate at the top of the instrument outer cover of the instrument; by utilizing the precise fitting of the positioning block 15 with these parts, the positions of the thermostatic block 13 and the high-temperature furnace body 1 are ensured precisely. Utilizing the design of the positioning block 15, the high-temperature furnace body 1 doesn't need to be positioned and connected to the frame on the instrument outer cover of the instrument by means of other positioning components at the top, and the top of the high-temperature furnace body 1 doesn't contact with the outer cover, thereby the heat conduction of the furnace body to the cast aluminum frame of the instrument outer cover via the positioning components on the top is cut off, and the temperature of the frame and the temperature of the instrument outer cover connected with the frame are effectively reduced.

With the above-mentioned optimized designs, the heat transfer from the high-temperature furnace body to the instrument outer cover 6 is greatly reduced, and the instrument outer cover of the instrument may be made of a plastic material, thus the material cost is reduced, and possible scalding of the operator caused by contacting the metal instrument outer cover is greatly reduced.

In addition, the design of the automatic centering and straightening function of the high-temperature furnace body 1 for the thermostatic block 13 is further optimized in the present disclosure: For example, when the base 11 and the thermostatic block 13 are mounted, four-point column positioning is employed, i.e. the support column 20 at the lower part of the thermostatic block 13 are fixedly connected to the thermostatic block 13, and the support column 20 and the support column mounting hole 12-1 on the ribbed bracket 11-1 are positioned by means of beveling the column (i.e., oval slots); besides, above the thermostatic block 13, four alignment slots 15-3 formed on the lower part of the positioning block 15 nest the upper ends of the heating rods 12 (four heating rods) on the thermostatic block 13, so that the torsional deviation between the thermostatic block 13 and the base 11 can be effectively controlled.

In addition, the base is processed through a die-casting process, and the outer cylinder 14-2 is processed through an extrusion molding process, thus the accuracy of flatness and parallelism of their mounting surfaces are high.

Furthermore, the outer cylinder 14-2 and the base 11 are in upper and lower installation e.g. connected through threaded connections in the vertical direction, and the base 11 inside the inner peripheral surface of the outer cylinder 14-2 is provided with guiding and limiting structures such as strip-shaped bosses 11-5 and stop blocks 11-6 (see FIGS. 5-4A and 5-6), the assembling accuracy of the outer cylinder is essentially equivalent to the processing accuracy of the outer cylinder, thus assembling error is eliminated.

The present disclosure is further elaborately designed in the aspect of airflow direction: Firstly, an airflow channel (i.e., cooling channel C1) is formed between the thermostatic block 13 and the inner cylinder 14-1 for quickly cooling the thermostatic block 13, and the air supply through the airflow channel is controlled by the cooling fan 16 and the air valve 17. By optimizing the design of the furnace body base 11, the inner cavity space of the box body of the base 11 is effectively utilized, and a fan bigger than the fans commonly used in the prior art can be mounted in the cavity, so that the cooling speed of the furnace body in the present disclosure is greatly improved. Please refer to the channel C1 shown in FIG. 5-8.

Secondly, a second airflow channel (i.e., a secondary cooling channel C2) is formed in the area among the cavity of the furnace body base 1, the frame of the cooling fan 16, the frame of the air valve 17, the inner cylinder 14-1 and the outer cylinder 14-2. When the furnace body operates, the external air entering the secondary cooling channel C2 can reduce the temperatures of the inner cylinder 14-1 and the outer cylinder 14-2 and reduce heat transfer from the high-temperature furnace body to the instrument. Please refer to the channel C2 shown I in FIG. 5-8.

Thirdly, as shown in FIGS. 5-8, a cooling channel C3 is further designed. The cooling channel C3 is an airflow channel specially formed between the outside of the heat-insulating cylinder 14 of the high-temperature furnace body 1 and other components in the instrument by the air from the space at the bottom of the furnace body passes through vents 11-7 arranged on one side of the base 11, and is used for cooling other components assembled in the instrument, such as the control board module 2 (see FIG. 5-1).

The high-temperature furnace body 1 has the following beneficial effects:
1) The inner cylinder is a sealed double-layer structure, which utilizes the static air between the two layers as a heat insulation zone, and has the characteristics of light weight and excellent heat insulation performance.
2) The high-temperature furnace body has a function of automatically centering and straightening the thermostatic block.
3) The modular design enables the high-temperature furnace body to be completely independent from other parts of the product, and can effectively improve the convenience of production and maintenance and reduce the production and maintenance costs of the product.
4) Utilizing an exquisite layout, the high-temperature furnace body is made more compact and more convenient to use.
5) The design of separate air channels ensures that the high-temperature air in the high-temperature furnace body has no harsh influence on the working environment of other parts of the product, thus reducing the high-temperature aging risk of the electronic components. Besides, it also isolates the influence of heat generation of other parts on the furnace body and improves the stability and accuracy of the high-temperature furnace body.
6) Since the thermostatic block can be automatically centered and straightened due to the structure, the assembly adjustment procedures are reduced and the production efficiency is improved.

Control Board Module

In the high-temperature dry block temperature calibrator, the control board module is used to maintain a stable temperature environment for the high-temperature furnace body. In the present disclosure, the control board module 2 is in a modular design. As shown in FIGS. 2A and 2B, the control board module 2 comprises a slot-type control board bracket 21, a switching power supply 22 (ESP-120-24 switching power supply) mounted on the inner bottom surface of the slot body of the control board bracket 21, a control board 24 which is provided with various control elements and connection lines and is mounted on the top surface of the slot body of the control board bracket 21, and a partition plate 23 mounted between the switching power supply 22 and the control board 24. The switching power supply 22 may be used to supply power to the control board 2 and the system board 3 simultaneously or separately. In view that the switching power supply unit 22 (ESP-120-24) generates heat during operation, the partition plate 23 is provided to prevent the heat from affecting the control board. In addition, the partition plate 23 also facilitates airflow to flow upwards under the action of the flow guide fan 25 (see the following description). The control board bracket 21, the switching power supply 22, the partition plate 23, and the control board 24 are assembled to form an integrated control board module 2.

In order to conveniently mount the control board module 2 in the instrument, one or more horizontally arranged assembling parts 9 are provided at the lowermost end of the slot body of the control board bracket 21, and the mounting holes of the assembling parts 9 are aligned to the mounting holes on the instrument lower support 5, so that the control board module 2 is fixed on the instrument lower support 5 by mounting screws; in addition, a plurality of assembling parts 9 extend on the bottom surface of the slot body of the control board bracket 21, and are aligned with the assembling parts 9 on the outer side of the adjacent high-temperature furnace body, so that the control board module 2 is fixedly connected with the high-temperature furnace body 1 by mounting screws.

In a more preferred design, the control board module 2 further comprises a flow guide fan 25, which is fixed in a mounting hole of a mounting plate 26 fixed at the uppermost part of the control board bracket 21; the operation of the flow guide fan 25 can drive the air in the control board module 2 to flow, and can also introduce external air from the space below the control board module 2 (the instrument lower support 5 under the control board module 2 is provided with ventilation slots), so as to realize heat dissipation for the control board module 2 and other modules adjacent thereto in the instrument, such as heat dissipation for the periphery of the high-temperature furnace body 1.

In addition, the control board 24 of the control board module 2 may further comprise Bluetooth and Wi-Fi assemblies to realize wireless communication.

Measurement Board Module

In the high-temperature dry block temperature calibrator, the measurement board module is used to connect measuring lines. In the present disclosure, the measurement board module 4 is in a modular design. As shown in FIGS. 4A and 4B, the measurement board module comprises a measurement board 41 and a front panel 42, which are arranged in alignment to each other. The measurement board 41 is provided with a TC socket element 43, the front panel 42 is provided with socket holes 44 in alignment to the TC socket element 43, a plurality of test connection terminals 45 are arranged on the measurement board 41, and a plurality of terminal holes 46 are arranged on the front panel 42 correspondingly. The measurement board 41 and the front panel 42 are superposed in alignment and fixed on the periphery to form the measurement board module 4. The measurement board module 4 as a whole is assembled on the lower part of the front side surface of the instrument outer cover 6. The top of the measurement board module 4 may be fixed to the instrument outer cover 6 by screws, and the bottom of the measurement board module 4 may also be fixed to the instrument lower support 5 by screws. The measurement board module 4 is located in front of the control board module 2 and is spaced apart from the control board module 2 with certain spacing to facilitate heat dissipation.

Figure 4D:
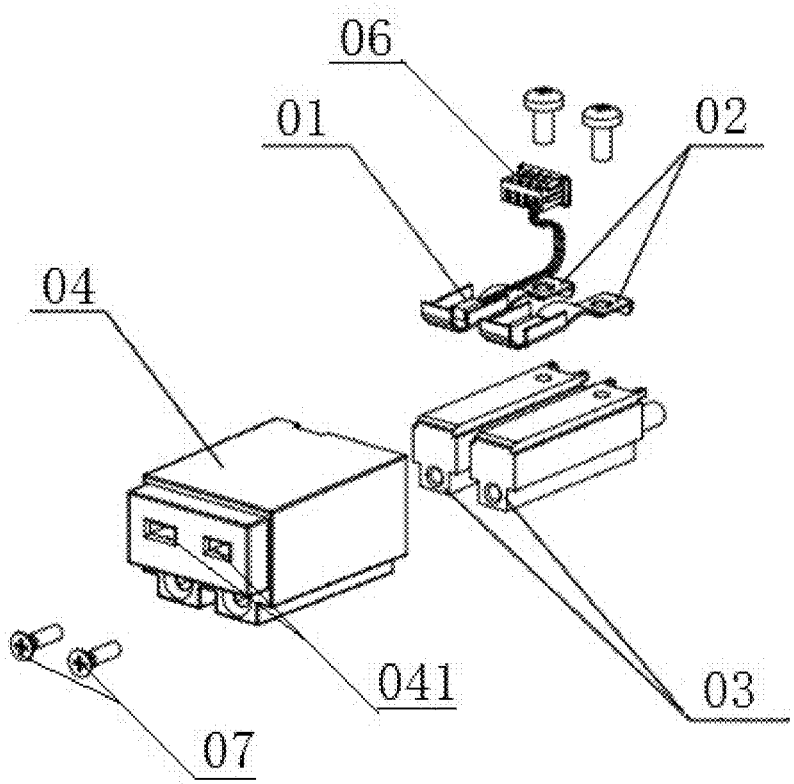
FIG. 4D is an exploded diagram of the structure of the thermocouple cold-end temperature compensation structure in the measurement board module.
Figure 4E:
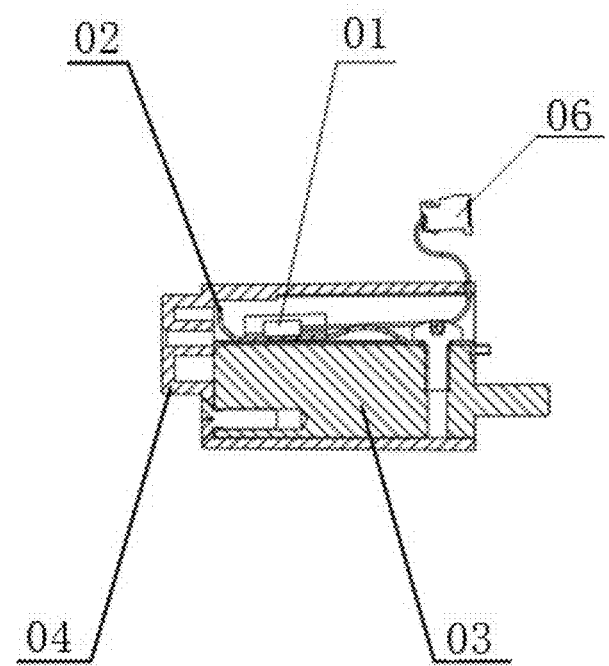
FIG. 4E is a cross-sectional view of the measurement board module taken along the line A-A in FIG. 4C.
Figure 4F:
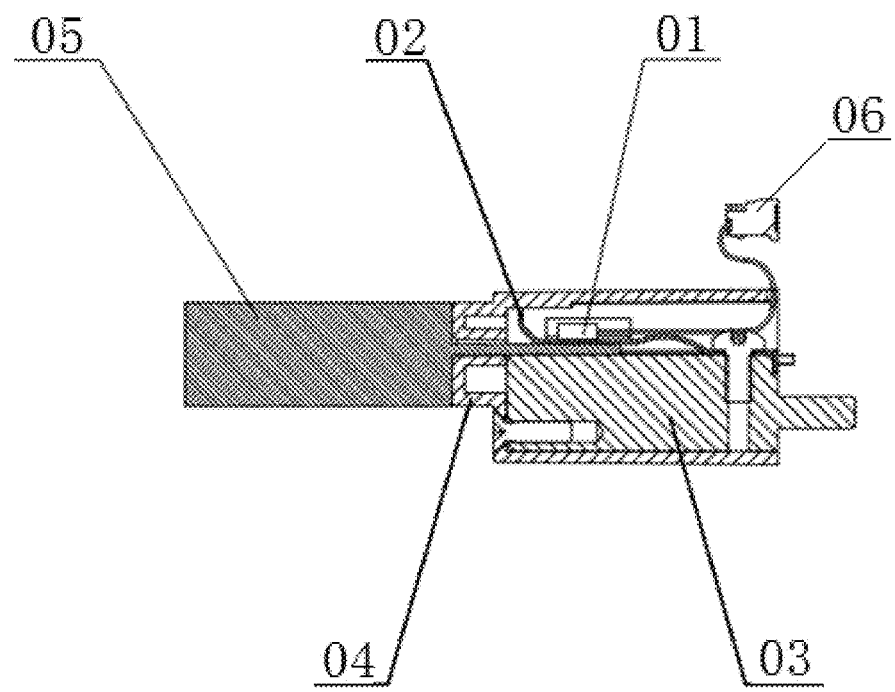
FIG. 4F is a schematic diagram of the structure of the thermocouple cold-end temperature compensation structure worked thermocouple together in the measurement board module.

To measure the temperature of the thermocouple accurately, the measurement board assembly 4 is integrated with a TC socket element 43, i.e., a thermocouple cold-end temperature compensation structure, which is fixed to the measurement board 41 by screws provided at the tail part thereof. Two sockets 041 at the front end of the TC socket element 43 (see FIG. 4D) are aligned to the socket holes 44 on the front panel 42, and a thermocouple may be inserted through the socket holes 44.

A common thermocouple cold-end compensation structure employs a scheme: a temperature equalizing block is placed in a cold-end heat-insulating compartment, and the cold-end temperature sensor and the cold end of the thermocouple are tightly attached to the temperature equalizing block. In such a structure, owing to the thermal resistance existing between the cold end of the thermocouple and the temperature equalizing block, the user has to wait a long time till the temperature difference between the cold-end temperature sensor on the temperature equalizing block and the cold end of the thermocouple is reduced, especially when thermocouples are measured in batch, the efficiency is low. To solve that problem, the present disclosure integrates a thermocouple cold-end temperature compensation structure in the measurement module, i.e., the TC socket element 43, for measuring the temperature of the cold end of the thermocouple quickly, and the structure can make the temperature of the cold end of the thermocouple 05 consistent with the temperature of the cold-end temperature sensor 01 in a shorter time, thus improves the efficiency of temperature measurement of the cold end of the thermocouple.

FIGS. 4C-4G are schematic diagrams of the thermocouple cold-end temperature compensation structure. As shown in FIGS. 4C-4G, the thermocouple cold-end compensation structure comprises a cold-end temperature sensor 01, an elastic plate 02 and second soaking blocks 03, wherein the second soaking blocks 03 are heat conductors with large thermal capacity, and two second soaking blocks 03 are provided and spaced from each other; the elastic plates 02 are elastomer with small thermal capacity and good thermal conductivity, and two elastic plates 02 are provided and respectively fixed on the two second soaking blocks 03. The elastic plate 02 is designed into an S-shaped structure, and the tail end (at the right side in FIG. 4E) of the elastic plate 02 is fixed on the tail part of the second soaking block 03; the head end of the elastic plate 02 rises up, and the part of the elastic plate 02 near the head end is freely placed on the upper surface of the second soaking block 03. Owing to the elasticity of the elastic plates 02, the cold end of the thermocouple 05 can be inserted into the position between the elastic plates 02 and the second soaking blocks 03 from the head end of the elastic plate 02 (see FIG. 4F). The cold-end temperature sensor 01 has characteristics of small size and low thermal capacity, and can be mounted above either elastic plate 02 to measure the temperature of cold-end of the thermocouple 05. Preferably, thermal conductive adhesive may be applied between the two second soaking blocks 03 to facilitate heat transfer between the two second soaking blocks 03 and to ensure that the temperatures of the two second soaking blocks 03 are kept essentially consistent with each other. In addition, the cold-end temperature sensor 01 is usually bonded to the elastic plate 02. In order to prevent the adhesive from overflowing from the elastic plate 02 in the bonding process, guard plates are respectively provided at both sides of the elastic plate 02 at a position where it is bonded to the cold-end temperature sensor 01.

To further process and apply the temperature value measured by the cold-end temperature sensor 1, a lead-out wire of the cold-end temperature sensor 01 is led out via a lead-out wire terminal 06, which is plugged into the measurement board 42.

To encapsulate the thermocouple cold-end temperature compensation structure so that it can be used conveniently, the thermocouple cold-end temperature compensation structure further comprises a cap 04 that is a square box. The cold-end temperature sensor 01, the elastic plates 02 and the second soaking blocks 03 are disposed in the cap 04, the second soaking blocks 03 are fixed to the cap 04 by screws 07, the lead-out wire of the cold-end temperature sensor 01 is led out from the tail part of the cap 04 and then connected into the lead-out wire terminal 06, the front end of the cap 04 is provided with two sockets 041 that respectively correspond to the positions between the elastic plates 02 and the second soaking blocks 03, the cold ends of the thermocouple 05 are respectively inserted into the position between the elastic plates 02 and the second soaking blocks 03 from the two sockets 041. Under the action of the elastic force of the elastic plates 02, both the elastic plates 02 and the second soaking blocks 03 are in close contact with the cold end of the thermocouple 05.

In order to ensure the performance of the thermocouple cold-end temperature compensation structure, it is required that the thermal capacity of the second soaking block 03 should be much larger than the thermal capacity of the elastic plate 02 and the thermal capacity of the cold-end temperature sensor 01. Besides, the cold end of the thermocouple 05, the second soaking block 03, the elastic plate 02 and the cold-end temperature sensor 01 should have high thermal conductivity; the cold-end temperature sensor 01 on the elastic plate 02 should be thermal insulated from the environment as far as possible. For example, a plastic sleeve or insulating glue should be applied to the portion of the cold-end temperature sensor 01 that is not in contact with the elastic plate 02.

In actual use, the cold end of the thermocouple 05 is connected between the elastic plate 02 and the second soaking block 03. When the temperature of the cold end of the thermocouple 05 is not consistent with the temperature of the second soaking block 03 and the elastic plate 02, heat will be transferred from the cold end of the thermocouple 05 to the second soaking block 03 and the elastic plate 02. As the thermal capacity of the second soaking block 03 is relatively large, the temperature of the cold end of the thermocouple 05 tends to the temperature of the soaking block 03. Besides, since the thermal capacity of the elastic plate 02 and the thermal capacity of the cold-end temperature sensor 01 on the elastic plate 02 are relatively small, the temperature of the cold-end temperature sensor 01 tends to the temperature of the cold end of the thermocouple 05 quickly, so that the temperature of the cold-end temperature sensor 01 quickly becomes essentially consistent with the temperature of the cold end of the thermocouple 05.

Figure 4G:
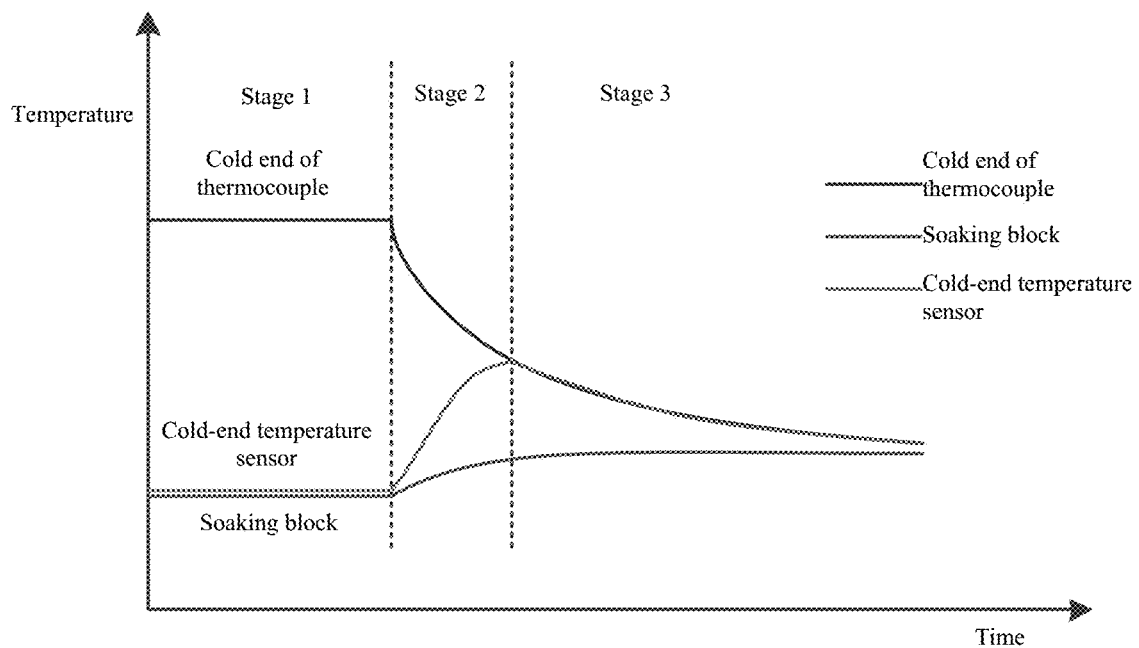
FIG. 4G is a working curve of the thermocouple cold-end temperature compensation structure in the measurement board module.

FIG. 4G shows a working curve of the thermocouple cold-end temperature compensation structure. The entire working process is divided into three stages:

Stage 1: The cold-end temperature sensor 01 and the second soaking block 03 are located in the cap 04 (equivalent to a traditional cold-end heat-insulating compartment), and their temperatures are essentially the same; the temperature of the cold end of thermocouple 05 is inconsistent with the temperature of the cold-end temperature sensor 01 and the temperature of the second soaking block 03.

Stage 2: The cold end of thermocouple 05 starts to transfer heat to the second soaking block 03, the elastic plate 02 and the cold-end temperature sensor 01 on the elastic plate 02 at the same time, and simultaneously the temperatures start to change and the temperature of the cold end of the thermocouple 05 tends to the temperature of the cold-end temperature sensor 01 (elastic plate 02) and the second soaking block 03; since the thermal capacity of the second soaking block 03 is relatively large, the temperature change of the second soaking block 03 is relatively slow. Besides, due to the large thermal capacity of the second soaking block 03, the temperature of the cold end of the thermocouple 05 may change quickly towards the temperature of the second soaking block 03; since the thermal capacity of the elastic plate 02 and the thermal capacity of the cold-end temperature sensor 01 on the elastic plate 02 are relatively small, the temperature change is quick. The temperature of the elastic plate 02 and the cold-end temperature sensor 01 on the elastic plate 02 may change quickly towards the temperature of the cold end of the thermocouple 05; under the combined effect of the second soaking block 03 and the elastic plate 02, the temperature of the cold-end temperature sensor 01 may tend to be consistent with the temperature of the cold end of the thermocouple 05 quickly. At the end of stage 2, the temperature of the cold-end temperature sensor 01 on the elastic plate 02 is essentially consistent with the temperature of the cold end of the thermocouple 05, but is still different from the temperature of the second soaking block 03.

Stage 3: The temperature of the cold end of the thermocouple 05 and the temperature of the cold-end temperature sensor 01 on the elastic plate 02 change almost synchronously, and the temperature of the cold-end temperature sensor 01 can already accurately reflect the temperature of the cold end of the thermocouple 05.

The thermocouple cold-end temperature compensation structure can quickly measure the temperature of the cold end of the thermocouple and has high efficiency. In the measurement process of the thermocouple, in order to ensure that the temperature of the cold end of thermocouple 05 is consistent with the temperature of the cold-end temperature sensor 01, the thermocouple cold-end temperature compensation structure can reduce the waiting time from the original a few minutes or even a dozen of minutes to a dozen of seconds or even a few seconds (depending on factors such as the temperature of the cold end of thermocouple 05 and the temperature of the cold-end temperature sensor 01 and the like). Especially, in the case of batch measurement of the temperature of the cold end of thermocouples, the measurement efficiency can be significantly improved, and the time can be saved.

System Board Module

Figure 3A:
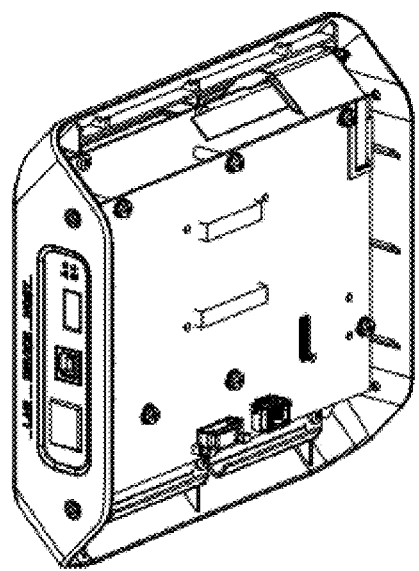
FIG. 3A is a perspective diagram of the system board module in the high-temperature dry block temperature calibrator according to the present disclosure.
Figure 3B:
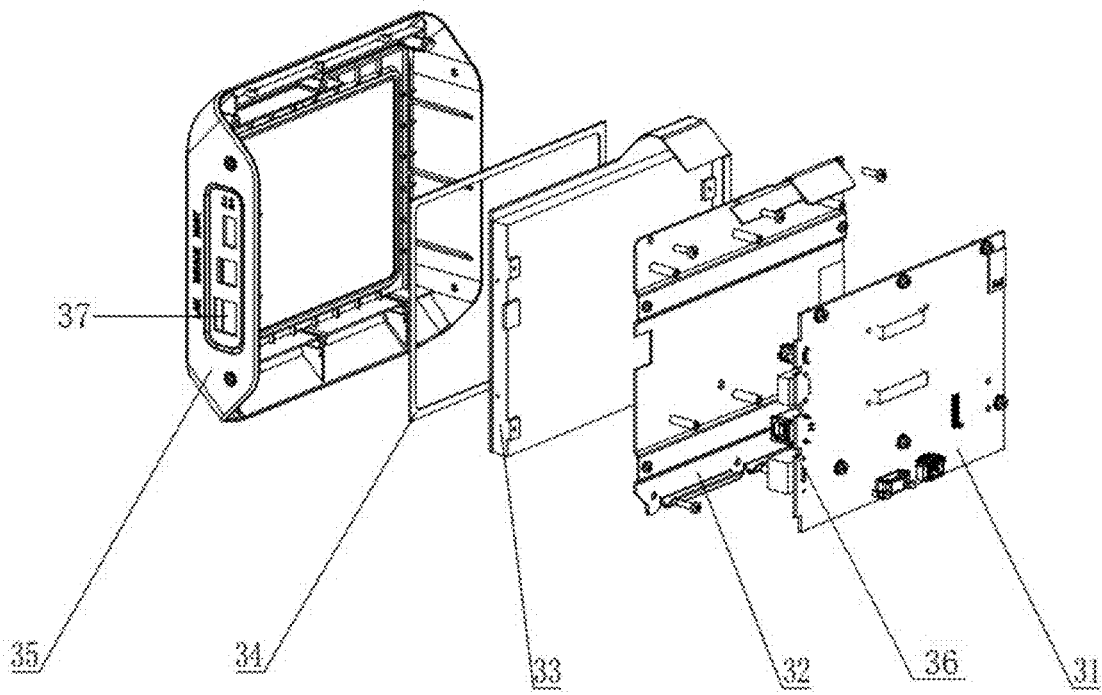
FIG. 3B is an exploded diagram of the system board module in the high-temperature dry block temperature calibrator according to the present disclosure.

In the high-temperature dry block temperature calibrator, the system board module 3 is used for parameter setting and data display, in order to realize human-machine interaction. In the present disclosure, the system board module 3 is in a modular design. As shown in FIGS. 3A and 3B, the system board module 3 comprises a touch screen panel 35, a touch screen foam 34, a touch LCD 33, a touch LCD bracket 32 and a system board 31, which are arranged from front to back sequentially. The touch screen panel 35 is in a cover shape, a cover surface of the touch screen panel 35 is provided with an assembling area that matches the touch LCD 33 in shape and size, one or more connection ports 36 are provided on a side of the system board 31, interface holes 37 are reserved on the corresponding side of the touch screen panel 35, and the connection ports 36 are mounted correspondingly to the interface holes 37. The touch screen foam 34, the touch LCD 33, the touch LCD bracket 32 and the system board 31 are stacked and assembled sequentially into the cover body of the touch screen panel 35 as a whole and thereby a system board module 3 is formed. The left and right side surfaces of the system board module 3 are respectively connected with the instrument outer cover 6 by screws, so that the system board module 3 can be detachably mounted on the upper part of the front side surface of the instrument outer cover 6.

Instrument Outer Cover and Instrument Lower Support

The high-temperature dry block temperature calibrator of the present disclosure is further provided with an instrument outer cover 6 and an instrument lower support 5. As shown in FIGS. 1A and 1B, the lower end of the instrument outer cover 6 is open, the instrument outer cover 6 is entirely arranged on the instrument lower support 5 and is engaged to the instrument lower support 5 on the periphery, and the control board module 2 and the high-temperature furnace body 1 are received in the space formed by the instrument outer cover 6 and the instrument lower support 5; the lower part of the front side surface of the instrument outer cover 6 is provided with an assembling area that matches the measurement board module 4 in shape and size, the upper part of the front side surface is provided with an assembling area that matches the system board module 3 in shape and size, and the top surface of the instrument outer cover 6 is provided with a jack corresponding to the furnace opening at the upper end of the high-temperature furnace body 1 for receiving the device under test.

For better heat dissipation, the instrument outer cover 6 is spaced apart from the periphery of the high-temperature furnace body 1, and a side of the instrument outer cover 6 near the top is provided with a set of side ventilation slots 61, so that contact with the high-temperature furnace body 1 can be avoided on one hand, and the hot air from the high-temperature furnace body 1 can be discharged from the side so as to prevent the hot gas from scorching of the handle of the device under test on the other hand. Through further optimization, the top surface of the instrument outer cover 6 near the side edges is provided with a set of top ventilation slots 62, so as to enhance the hot air to exhaust from the inside of the instrument, which facilities the overall heat dissipation of the instrument. In further optimization, the instrument outer cover 6 is spaced apart from the flow guide fan 25 at the upper end of the control board module 2. Thus, when the flow guide fan 25 operates, it not only drives the airflow in the control board module 2 to flow, but also drives the airflow in the instrument outer cover 6 to flow, which is beneficial for overall heat dissipation of the instrument. Due to the above mentioned heat dissipation design, the instrument outer cover 6 may be made of a plastic material, not only the material cost but also the weight of the instrument can be reduced, so that the temperature calibrator in the present disclosure is suitable for carrying. To facilitate carrying, a lifting handle may further be designed at the top of the instrument outer cover 6.

The instrument lower support 5 provides support for the instrument, and is engaged to the instrument outer cover 6 to form a housing of the instrument. Several mounting holes are distributed on the bottom surface of the instrument lower support 5 for assembling the high-temperature furnace body 1, the control board module 2, the measurement board module 4, and the instrument outer cover 6. In order to supply external air into the instrument, several ventilation slot holes are arranged on the bottom surface and side surfaces of the instrument lower support 5, and the form, quantity and positions of the ventilation slot holes and the like may be designed according to the specific distribution. There is no particular restriction in the present disclosure.

Protective Apparatus

The high-temperature dry block temperature calibrator in the present disclosure may further be provided with a protective apparatus 7, such as a protective frame or a protective cover, as shown in FIGS. 1A and 1B. The protective apparatus 7 is arranged on top of the instrument outer cover 6, and its sides are designed in a form favorable for convection with outside air to facilitate lateral heat dissipation, such as in a form of a leg as shown in FIG. 1B or other rib with larger air outlets; the top of the protective apparatus 7 is a protective plate, which is only provided with a hole corresponding to the furnace opening at the top of the high-temperature furnace body 1 and the jack at the top of the instrument outer cover to receive the device under test. By providing the protection device 7 additionally, the hot airflow from the high-temperature furnace body can be further dispersed to the sides and thereby cooled down quickly. Thus, scorching of the handle of the device under test outside the protective apparatus 7 by the hot airflow is relieved, failures of the sensor inside the handle caused by high temperature are avoided, and the safety of the operator handling the device under test is protected.

The high-temperature dry block temperature calibrator in the present disclosure may be assembled as follows: The high-temperature furnace body 1 is mounted at a back position of the instrument lower support 5, the control board module 2 is mounted on the instrument lower support 5 at a position near the high-temperature furnace body 1 and is connected with the high-temperature furnace body 1, the instrument outer cover 6 is placed on the instrument lower support 5 and engaged on the side periphery surface of instrument lower support, the measurement board module 4 is mounted on the lower part of the front panel of the instrument outer cover 6, and the system board module 3 is mounted on the upper part of the front panel of the instrument outer cover 6. Thus, the assembling of the high-temperature dry block temperature calibrator is completed. If necessary, the protective apparatus 7 may be mounted on the top surface of the instrument outer cover 6. Since the components that constitute the temperature calibrator are in a modular design, it is easy to assemble and disassemble and convenient for maintenance or replacement.

To realize a better flow guiding and heat dissipation function, when the high-temperature dry block temperature calibrator is assembled, certain spacing may be reserved between the high-temperature furnace body 1 and the control board module 2, so that an airflow channel (e.g., air channel C3) is formed between the high-temperature furnace body 1 and the control board module 2.

In the high-temperature dry block temperature calibrator in the present disclosure, the system board 31, the control board 24, the measurement board 41, the thermostatic block 13, the heating device 12, the cooling fan 16, the flow guide fan 25 and the like are all electrically connected, and the instrument may be self-powered (e.g., with an ESP-120-24 switching power supply) or externally powered. During operation, the system board 31 receives operation commands, the system board module 3 sends the operation commands to the control board module 2, the control board 24 controls the heating device 12 and/or the cooling fan 16 in the high-temperature furnace body 1 to operate to reach a constant operating temperature according to the commands.

The invention claimed is:

1. A high-temperature dry block temperature calibrator, used for temperature calibration of a high temperature element under test, comprising:
a high-temperature furnace body and a control board module, which are independently assembled on an instrument lower support and located in a cover body of an instrument outer cover assembled above the instrument lower support and engaged at a periphery;
a system board module assembled on a side surface of the instrument outer cover; and
a protective apparatus arranged at the top of the instrument outer cover, wherein a top protective plate of the protective apparatus is provided with a hole corresponding to a furnace opening of the high-temperature furnace body and a jack at the top of the instrument outer cover in order to receive the element under test, and the side surfaces of the protective apparatus are open or are ribbed plates with air outlets,
wherein the high-temperature furnace body comprises:
a base arranged at the bottom of the high-temperature furnace body;
a thermostatic block and a heat-insulating cylinder which are fixed on the base, wherein the heat-insulating cylinder is disposed on the outer periphery of the thermostatic block with a certain spacing from the thermostatic block to form a cooling channel; and
a cooling fan mounted in a cavity of the base;
the base is provided with ventilation holes in communication with the cooling channel, and the cooling fan is in communication with the cooling channel through the ventilation holes, and
wherein the heat-insulating cylinder comprises an inner cylinder and an outer cylinder sleeved outside the inner cylinder, and the inner cylinder is a sealed double-layer structure, which is a hollow heat insulation cylinder consisting of an inner wall, an outer wall and closure plates at the two ends; the inner cylinder is arranged outside the thermostatic block with a certain spacing from the thermostatic block to form the cooling channel, the outer cylinder is arranged around the inner cylinder and a spacing therebetween forms a secondary cooling channel, and the bottom of the inner cylinder and the bottom of the outer cylinder are fixed on the base of the high-temperature furnace body; the top of the inner cylinder and the top of the outer cylinder are engaged by means of a positioning block, which is provided with an airflow outlet in communication with the cooling channel and the secondary cooling channel.

2. The high-temperature dry block temperature calibrator according to claim 1, further comprising a measurement board module assembled on the instrument outer cover and connected with the instrument lower support, and there is a spacing between the measurement board module and the control board module,
wherein there is a spacing between the high-temperature furnace body and the control board module, the jack for receiving the element under test is arranged on the top surface of the instrument outer cover at a position corresponding to the furnace opening of the high-temperature furnace body, and there is a spacing between the instrument outer cover and the outer periphery of the high-temperature furnace body, and a set of side ventilation slots is arranged on a side surface of the instrument outer cover near the top.

3. The high-temperature dry block temperature calibrator according to claim 2, wherein the measurement board module comprises:
a measurement board provided with a TC socket element and a plurality of test connection terminals thereon; and
a front panel aligned, superposed and fixed to the measurement board and provided with a socket hole and a plurality of terminal holes that match the TC socket element and the test connection terminals,
wherein the TC socket element is a thermocouple cold-end temperature compensation structure, comprising:
two soaking blocks spaced apart from each other, each of which is connected with an elastic plate thereon; and
a cold-end temperature sensor mounted on the upper side of either elastic plate, the cold end of the thermocouple is arranged between the elastic plate and the soaking blocks and is tightly attached to the elastic plate and the soaking blocks;

the thermal capacity of the soaking blocks is larger than the thermal capacity of the elastic plate and the thermal capacity of the cold-end temperature sensor.

4. The high-temperature dry block temperature calibrator according to claim 3, wherein the elastic plate is an elastomer and has an S-shaped structure, the tail end of the elastic plate is fixed to the tail end of the respective soaking block, the head end of the elastic plate rises up, and a portion close to the head end is freely disposed on the upper surface of the respective soaking block; heat-conducting adhesive is applied between the two soaking blocks.

5. The high-temperature dry block temperature calibrator according to claim 4, wherein the thermocouple cold-end temperature compensation structure further comprises:
   a cap that is a square box and used for receiving the cold-end temperature sensor, the elastic plate and the soaking blocks, wherein the front end of the cap is provided with two sockets corresponding to the position between the elastic plate and the soaking blocks so that the cold end of the thermocouple is inserted therein; and
   a lead-out wire terminal, with one end plugged on the measurement board and the other end connected with a lead-out wire of the cold-end temperature sensor led out from the tail of the cap.

6. The high-temperature dry block temperature calibrator according to claim 5, wherein a portion of the cold-end temperature sensor mounted on the elastic plate, where the cold-end temperature sensor is not in contact with the elastic plate, is provided with a plastic sleeve or heat-insulating adhesive; the cold-end temperature sensor is adhered to the elastic plate by an adhesive, and a guard plate is respectively provided at both sides of the elastic plate where it is bonded to the cold-end temperature sensor.

7. The high-temperature dry block temperature calibrator according to claim 1, wherein the end surface of the base where the heat-insulating cylinder is fixed is provided with a support column mounting hole for mounting a support column that supports the thermostatic block, the top end of the support column is fixedly connected with the thermostatic block, and the bottom end of the support column is engaged in the support column mounting hole; the lower part of the positioning block is provided with an alignment slot, and the upper end of a heating rod on the thermostatic block is engaged in the alignment slot,
   wherein the base has a box structure, a ribbed bracket is arranged on the top end surface of the base where the heat-insulating cylinder is fixed, the clearance areas between the ribs are in communication with an inner cavity of the box body of the base, the ribbed bracket is in a bridge arch shape and arches from the side edges to the central part, and the support column mounting hole is arranged on the ribbed bracket.

8. The high-temperature dry block temperature calibrator according to claim 1, wherein a plurality of strip-shaped bosses are distributed on the end surface of the base where the heat-insulating cylinder is fixed, and the outer cylinder is sleeved outside of the strip-shaped bosses from top to bottom,
   wherein a plurality of outer cylinder stop blocks are uniformly distributed or symmetrically arranged among the strip-shaped bosses, and the outer cylinder stop blocks are located inside or outside of the outer cylinder,
   wherein a plurality of protrusions are distributed on the edges of the ribbed bracket, and the inner cylinder is sleeved outside of the protrusions from top to bottom and fixed with the protrusions; there is spacing between the protrusions and the strip-shaped bosses, and the spacing matches the spacing between the outer cylinder and the inner cylinder.

9. The high-temperature dry block temperature calibrator according to claim 1, wherein a through-slot in communication with the inner cavity of the box body of the base is provided in an area of the base corresponding to the area between the outer cylinder and the inner cylinder, and the through-slot is in communication with the secondary cooling channel.

10. The high-temperature dry block temperature calibrator according to claim 1, further comprising:
    an air valve fixed in the inner cavity of a box body of the base and located above the cooling fan.

11. The high-temperature dry block temperature calibrator according to claim 10, wherein the base extends toward one side and thereby forms a plane, one or more vents are arranged on the plane, and the vents communicate with the external air from the bottom of the high-temperature furnace body but do not communicate with the cooling channel.

12. The high-temperature dry block temperature calibrator according to claim 1, wherein the control board module comprises:
    a slot-type control board bracket, a switching power supply assembled in the slot body of the control board bracket, a control board mounted at an opening of the slot body of the control board bracket, and a partition plate mounted between the switching power supply and the control board,
    wherein the control board module is further provided with a flow guide fan that is fixed at the top of the control board module and in communication with the slot body of the control board module, and the instrument lower support below the control board module is provided with a ventilation slot.

13. A high-temperature dry block temperature calibrator, used for temperature calibration of a high temperature element under test, comprising:
    a high-temperature furnace body and a control board module, which are independently assembled on an instrument lower support and located in a cover body of an instrument outer cover assembled above the instrument lower support and engaged at a periphery; and
    a system board module assembled on a side surface of the instrument outer cover,
    wherein the high-temperature furnace body comprises:
        a base arranged at the bottom of the high-temperature furnace body;
        a thermostatic block and a heat-insulating cylinder which are fixed on the base, wherein the heat-insulating cylinder is disposed on the outer periphery of the thermostatic block with a certain spacing from the thermostatic block to form a cooling channel; and
        a cooling fan mounted in a cavity of the base;
        the base is provided with ventilation holes in communication with the cooling channel, and the cooling fan is in communication with the cooling channel through the ventilation holes,
    wherein the heat-insulating cylinder comprises an inner cylinder and an outer cylinder sleeved outside the inner cylinder, and the inner cylinder is a sealed double-layer structure, which is a hollow heat insulation cylinder consisting of an inner wall, an outer wall and closure plates at the two ends; the inner cylinder is arranged outside the thermostatic block with a certain spacing from the thermostatic block to form a cooling channel, the outer cylinder is arranged around the inner cylinder and a spacing therebetween forms a secondary cooling channel, and the bottom of the inner cylinder and the bottom of the outer cylinder are fixed on the base of the high-temperature furnace body; the top of the inner cylinder and the top of the outer cylinder are engaged by means of a positioning block, which is provided with an airflow outlet in communication with the cooling channel and the secondary cooling channel, and wherein a through-slot in communication with the inner cavity of a box body of the base is provided in an area of the base corresponding to the area between the outer cylinder and the inner cylinder, and the through-slot is in communication with the secondary cooling channel.

14. The high-temperature dry block temperature calibrator according to claim 13, further comprising:
an air valve fixed in the inner cavity of the box body of the base and located above the cooling fan.

15. The high-temperature dry block temperature calibrator according to claim 13, wherein the control board module comprises:
a slot-type control board bracket, a switching power supply assembled in the slot body of the control board bracket, a control board mounted at an opening of the slot body of the control board bracket, and a partition plate mounted between the switching power supply and the control board,
wherein the control board module is further provided with a flow guide fan that is fixed at the top of the control board module and in communication with the slot body of the control board module, and the instrument lower support below the control board module is provided with a ventilation slot.

16. The high-temperature dry block temperature calibrator according to claim 13, further comprising a measurement board module assembled on the instrument outer cover and connected with the instrument lower support, and there is a spacing between the measurement board module and the control board module,
wherein the measurement board module comprises:
a measurement board provided with a TC socket element and a plurality of test connection terminals thereon; and
a front panel aligned, superposed and fixed to the measurement board and provided with a socket hole and a plurality of terminal holes that match the TC socket element and the test connection terminals, wherein the TC socket element is a thermocouple cold-end temperature compensation structure, comprising:
two soaking blocks spaced apart from each other, each of which is connected with an elastic plate thereon; and
a cold-end temperature sensor mounted on the upper side of either elastic plate, the cold end of the thermocouple is arranged between the elastic plate and the soaking blocks and is tightly attached to the elastic plate and the soaking blocks;
the thermal capacity of the soaking blocks is larger than the thermal capacity of the elastic plate and the thermal capacity of the cold-end temperature sensor.

17. The high-temperature dry block temperature calibrator according to claim 16, wherein the thermocouple cold-end temperature compensation structure further comprises:
a cap that is a square box and used for receiving the cold-end temperature sensor, the elastic plate and the soaking blocks, wherein the front end of the cap is provided with two sockets corresponding to the position between the elastic plate and the soaking blocks so that the cold end of the thermocouple is inserted therein; and
a lead-out wire terminal, with one end plugged on the measurement board and the other end connected with a lead-out wire of the cold-end temperature sensor led out from the tail of the cap.

\* \* \* \* \*